US012810675B2

(12) United States Patent
Prasher

(10) Patent No.: US 12,810,675 B2
(45) Date of Patent: Nov. 24, 2026

(54) SMART GATE WITH ADVANCED RECOGNITION CAPABILITIES

(71) Applicant: Ravi Prasher, Vaughan (CA)

(72) Inventor: Ravi Prasher, Vaughan (CA)

(73) Assignee: MCK Network Solutions Inc., Huntsville (CA)

( * ) Notice: Subject to any disclaimer, the term of this patent is extended or adjusted under 35 U.S.C. 154(b) by 0 days.

(21) Appl. No.: 18/990,009

(22) Filed: Dec. 20, 2024

(65) Prior Publication Data

US 2026/0179424 A1 Jun. 25, 2026

(51) Int. Cl.
*G07C 9/37* (2020.01)
*G06V 20/52* (2022.01)
*G06V 40/16* (2022.01)

(52) U.S. Cl.
CPC ............... *G07C 9/37* (2020.01); *G06V 20/52* (2022.01); *G06V 40/172* (2022.01); *G06V 2201/08* (2022.01); *G06V 2201/09* (2022.01)

(58) Field of Classification Search
CPC ........ G07C 9/37; G06V 40/00; G06V 40/172; G06V 2201/08; G06V 2201/09
See application file for complete search history.

(56) References Cited

U.S. PATENT DOCUMENTS 10,906,509 B1 * 2/2021 Turk .................... G07C 5/0866
11,488,077 B1 * 11/2022 Lyman ................ H04L 12/2825
11,657,666 B2 * 5/2023 Kerzner ................... G07C 9/23 340/5.54
2018/0285653 A1 * 10/2018 Li .................... G08B 13/19645
(Continued)

FOREIGN PATENT DOCUMENTS

CN 114359883 A 4/2022
CN 115588249 A 1/2023
(Continued)

OTHER PUBLICATIONS

UK Intellectual Property Office; Search Report under Section 17(5) relating to application No. GB2522225.8 dated May 6, 2026.

*Primary Examiner* — Nabil H Syed
(74) *Attorney, Agent, or Firm* — Rowand LLP

(57) ABSTRACT

The present disclosure relates to a smart gate of a property. The smart gate is coupled to a wireless communication system and further comprises a processor and a memory storing processor-executable instructions. Execution of the processor-executable instructions cause the processor to: receive, sensor data from one or more sensors deployed on the smart gate; detect from the sensor data that a vehicle has arrived at the smart gate at an actual arrival time; receive, from at least a first one of one or more image capturing devices deployed on the smart gate, the one or more images of the vehicle; determine, by processing the one or more images of the vehicle, that the vehicle is associated with an expected arrival event, the expected arrival event being associated with a time interval defined by a first time and a second time, the first time being earlier than the second time; determine, based at least in part on the actual arrival time and the time interval, that conditions associated with the expected arrival event have been sufficiently satisfied; and cause the smart gate to open in response to determining that the conditions have been sufficiently satisfied.

20 Claims, 11 Drawing Sheets

(56) References Cited

U.S. PATENT DOCUMENTS

| | | | | |
|---|---|---|---|---|
| 2019/0213311 | A1* | 7/2019 | Tussy | G06V 40/70 |
| 2019/0304220 | A1* | 10/2019 | Lee | E01F 13/08 |
| 2019/0325681 | A1* | 10/2019 | Bresson | E05F 15/668 |
| 2021/0201269 | A1* | 7/2021 | Ainsworth | G06Q 10/06 |
| 2023/0140203 | A1* | 5/2023 | Peng | G07C 9/00309 |
| 2025/0191452 | A1* | 6/2025 | Sedouram | G06F 3/04886 |

FOREIGN PATENT DOCUMENTS

| | | | |
|---|---|---|---|
| CN | 118211893 | A | 4/2025 |
| WO | 2026006749 | A1 | 1/2026 |

* cited by examiner

SMART GATE WITH ADVANCED RECOGNITION CAPABILITIES

FIELD

The present disclosure is related to a system and method for a gate that automatically opens. In particular, the present disclosure is related to a gate that automatically opens upon recognition of a vehicle at a scheduled time or time interval.

BACKGROUND

Smart gates are used as part of security systems. A smart gate is a gate that can automatically open in a given situation. For example, a smart gate may open upon recognizing a license plate number. In another example, a smart gate may open upon recognizing a face of a person.

However, existing smart gates, or smart gate systems, lack advanced delivery recognition or scheduled arrival recognition capabilities. That is, existing smart gates and smart gate systems can be improved upon by adding the capability to recognize the occurrence of a scheduled event or scheduled arrival of a service or delivery. Adding these capabilities allows a smart gate or smart gate system to become more secure and reliable.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
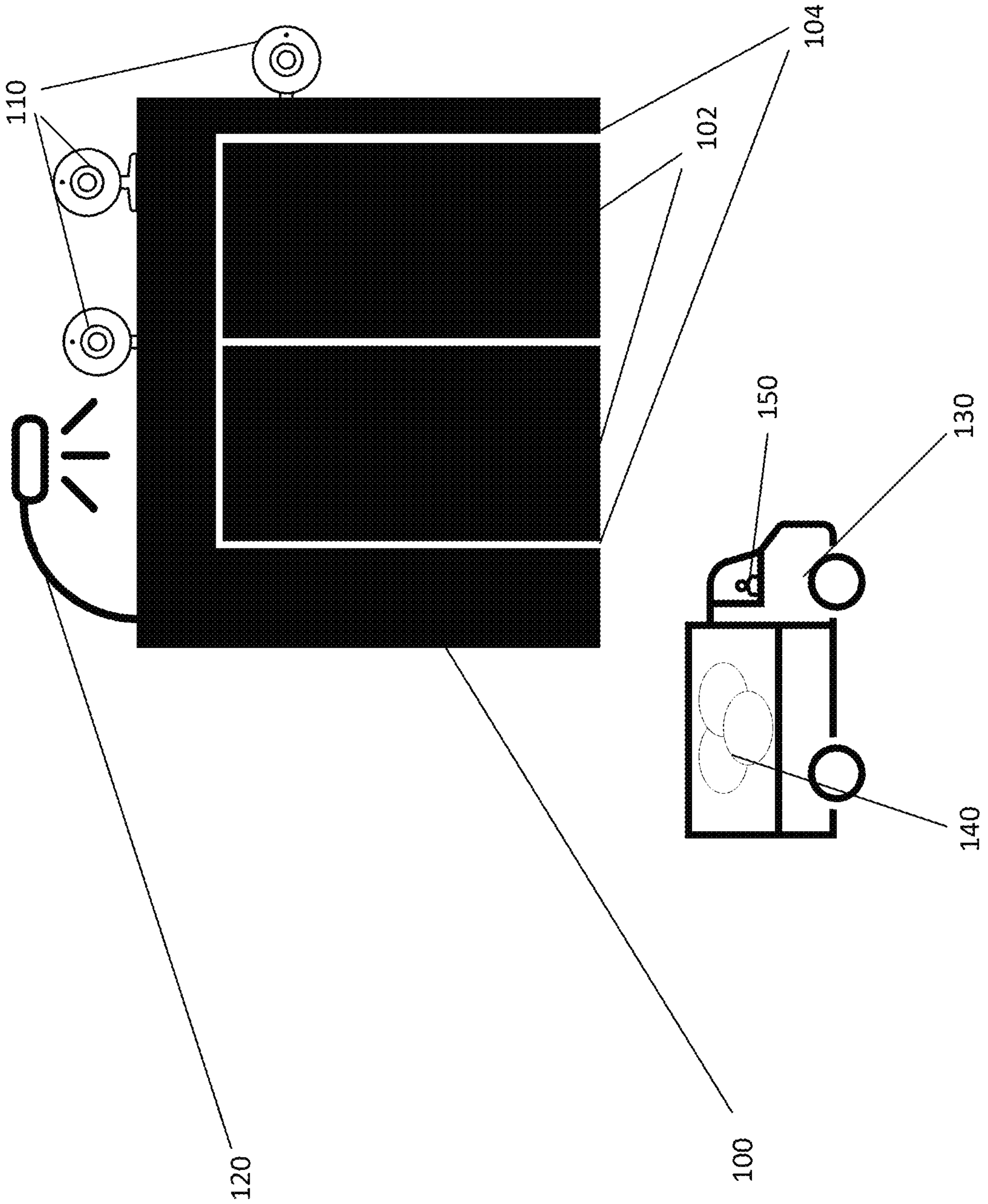
FIG. 1 is a front view of an example smart gate and a vehicle.

In an aspect, the present application describes a smart gate controller for a gate of a property. The smart gate controller comprises a processor and a memory. The memory stores processor-executable instructions that, when executed, are to cause the processor to: receive sensor data from one or more sensors deployed on the gate; detect from the sensor data that a vehicle has arrived at the gate at an actual arrival time; receive, from at least a first one of one or more image capturing devices, the one or more image capturing devices being a subset of the one or more sensors, one or more images of the vehicle; determine, by processing the one or more images of the vehicle, that the vehicle is associated with an expected arrival event, the expected arrival event being associated with a time interval defined by a first time and a second time, the first time being earlier than the second time; determine, based at least in part on the actual arrival time and the time interval, that conditions associated with the expected arrival event have been sufficiently satisfied; and actuate the gate in response to determining that the conditions have been sufficiently satisfied.

In some implementations, the processor is further configured to determine that the vehicle is associated with the expected arrival event by: using the one or more images of the vehicle as input to a vehicle recognition machine learning model; and determining that the vehicle belongs to a class of vehicles associated with the expected arrival event.

In some implementations the processor is further configured to determine that the vehicle is associated with the expected arrival event by: recognizing, by using the one or more images of the vehicle as input to a logo recognition machine learning model, a logo on the vehicle; and determining that the logo is associated with the expected arrival event.

In some implementations, the processor is further configured to determine that the conditions associated with the expected arrival event have been sufficiently satisfied by: receiving, from at least a second one of the one or more image capturing devices, one or more images of a face of a driver of the vehicle; and determining, by processing the one or more images of the face, that the driver is an authorized person.

In some implementations, the processor is further configured to determine that the conditions associated with the expected arrival event have been sufficiently satisfied by: detecting, from the sensor data, a number of occupants of the vehicle; and determining that the number of occupants is an expected number of occupants associated with the expected arrival event.

In some implementations, the processor is further configured to determine that the conditions associated with the expected arrival event have been sufficiently satisfied by: receiving, from at least a second one of the one or more image capturing devices, one or more images of a driver of the vehicle; and determining, by processing the one or more images of the driver, that the driver is wearing a uniform associated with the expected arrival event.

In some implementations, the smart gate controller is coupled to a wireless communication system and the processor is further configured to: receive from a server, via a wireless communication, prior to the vehicle arriving at the gate, an estimated arrival time of the vehicle; and update, in response to receiving the estimated arrival time, the first time and the second time.

In some implementations, the smart gate controller is coupled to a wireless communication system and the processor is further configured to: receive from a server, via wireless communication, prior to the vehicle arriving at the gate, location data identifying a location of the vehicle; receive from a second server, via wireless communication, traffic data related to a route from the location to the gate; predict an estimated arrival time based on the location data and the traffic data; and update based on the estimated arrival time, the first time and the second time.

In some implementations, the expected arrival event is one of a series of recurring scheduled events and the processor is further configured to predict the estimated arrival time by: obtaining, from a storage, historical data related to arrivals of at least one motor vehicle in relation to the recurring scheduled events; and considering the historical data to predict the estimated arrival time.

In some implementations, the processor is further configured to determine that the conditions associated with the expected arrival event have been sufficiently satisfied by: detecting an inconsistency between the actual arrival time and the time interval; transmitting to an onboard system of the vehicle, in response to detecting the inconsistency, via wireless communication, a notification wherein the notification includes a request for an explanation for the inconsistency; receiving from the onboard system, via wireless communication, a voice message, the voice message including a reason for the inconsistency; and determining, by processing the voice message using a natural language processing machine learning model, that the reason is valid.

In some implementations, the processor is further configured to send, in response to receiving the one or more images of the vehicle, an arrival notification to a user device associated with the property, the arrival notification including at least one of the one or more images of the vehicle.

In some implementations, the processor is further configured to determine that the conditions associated with the expected arrival event have been sufficiently satisfied by: detecting an inconsistency between the actual arrival time and the time interval; sending to the user device, in response to detecting the inconsistency, an entry request for the vehicle; and receiving, from the user device, an entry approval for the vehicle.

In some implementations, the expected arrival event is one of a series of recurring scheduled events and the processor is further configured to set, in response to the receiving of the entry approval despite the inconsistency, a next time interval, associated with a next expected arrival event in the series, to be longer than the time interval.

In some implementations, the processor is further configured to: detect from the sensor data that the vehicle is leaving the property at a departure time; and send a departure notification to the user device, the departure notification including an on-property time interval defined by the actual arrival time and the departure time.

In some implementations, the processor is further configured to: detect from the sensor data that one of the one or more sensors is performing at a performance level lower than a standard; and send, in response to detecting the lower performance level, a performance level notification to the user device, the performance level notification indicating that the one of the one or more sensors is performing at the lower performance level.

In some implementations, the smart gate controller is coupled to a wireless communication system. Additionally, the expected arrival event is associated with a task and the processor is further configured to: determine, prior to the vehicle arriving at the gate, an ideal time interval for the task to be initiated, the ideal time interval being defined by an ideal first time and an ideal second time; transmit to a server associated with the expected arrival event, via wireless communication, a scheduling request to have the expected arrival event occur during the ideal time interval; receive from the server, via wireless communication, a confirmation notification, the confirmation notification including confirmation that the server has instructed the vehicle to arrive at the property during the ideal time interval; and set the first time to be the ideal first time and the second time to be the ideal second time.

In some implementations, one or more light sources are deployed on the gate and the processor is further configured to: detect, from the sensor data, that the vehicle is near the gate; determine, from the sensor data, that an area around the gate has a brightness measure below a lighting threshold, the lighting threshold being related to an accuracy measure related to processing the one or more images of the vehicle; and cause at least one of the one or more light sources to turn on.

In another aspect, the present application discloses a computer-implemented method for actuating a gate of a property. the method comprises: receiving sensor data from one or more sensors deployed on the gate; detecting, from the sensor data, that a vehicle has arrived at the gate at an actual arrival time; receiving, from at least a first one of one or more image capturing devices, the one or more image capturing devices being a subset of the one or more sensors, one or more images of the vehicle; determining, by processing the one or more images of the vehicle, that the vehicle is associated with an expected arrival event, the expected arrival event being associated with a time interval defined by a first time and a second time, the first time being earlier than the second time; determining, based at least in part on the actual arrival time and the time interval, that conditions associated with the expected arrival event have been sufficiently satisfied; and actuating the gate in response to determining that the conditions have been sufficiently satisfied.

In some implementations, the method further comprises: receiving from a server, via wireless communication, prior to the vehicle arriving at the gate, location data identifying a location of the vehicle; receiving from a second server, via wireless communication, traffic data related to a route from the location to the gate; predicting an estimated arrival time based on the location data and the traffic data; and updating, based on the estimated arrival time, the first time and the second time.

In another aspect, the present applications discloses a non-transitory computer-readable medium. The medium stores processor-executable instructions to: receive sensor data from one or more sensors deployed on a gate; detect from the sensor data that a vehicle has arrived at the gate at an actual arrival time; receive, from at least a first one of one or more image capturing devices, the one or more image capturing devices being a subset of the one or more sensors, one or more images of the vehicle; determine, by processing the one or more images of the vehicle, that the vehicle is associated with an expected arrival event, the expected arrival event being associated with a time interval defined by a first time and a second time, the first time being earlier than the second time; determine, based on the actual arrival time and the time interval, that conditions associated with the expected arrival event have been sufficiently satisfied; and actuate the gate in response to determining that the conditions have been sufficiently satisfied.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrases "at least one of . . . and . . . " is intended to cover any one or more of the listed elements, including any one of the listed elements alone, any sub-combination, or all of the elements, without necessarily excluding any additional elements, and without necessarily requiring all of the elements. Similarly, the phrase "at least one of . . . or . . . " is also intended to cover any one or more of the listed elements, including any one of the listed elements alone, any sub-combination, or all of the elements, without necessarily excluding any additional elements, and without necessarily requiring all of the elements.

In the present application, the term "smart gate" may be used as if the "smart gate" has computer or computer-like functionality or operability. In these statements, it may be understood that a smart gate controller or smart gate system that controls a gate, smart gate or "dumb gate" is performing computer or computer-like functions or operations. That is, in at least some instances, the terms "smart gate" and "smart gate system" and "smart gate controller" may be used interchangeably.

The present disclosure relates to a smart gate and/or a smart gate system. A smart gate and/or smart gate system may comprise an element that acts as a moveable barrier or moveable barriers to entrants or individuals passing through a path. In some embodiments, the moveable barrier may block unwanted individuals or objects from entering a property, house, home, facility, area, zone, location, locality, passageway, terminal, station, or building. The moveable barrier may be moved to allow individuals or objects to enter a property, house, home, facility, area, zone, location, locality, passageway, terminal, station, or building. In some embodiments, the moveable barriers may move by sliding along a line, sliding along a curve, rotating along one or more axes or hinges, be lifted up, be sunk into the ground, or a combination thereof. Moving the moveable barriers to allow entrants may be considered opening the gate, smart gate, or smart gate system. Moving the moveable barriers to prevent entrants may be considered closing the gate, smart gate, or smart gate system. Additionally or alternatively, moving the moveable barriers to either open or close the gate may be considered actuating the gate.

The smart gate and/or smart gate system may also comprise a processor and/or computer system that allows the smart gate to automatically open, automatically close, or automatically actuate. The smart gate may also interact with a user device to notify or inform a manager of the smart gate about statuses or conditions with respect to the smart gate. For example, a smart gate may notify a resident of a home that a delivery has arrived.

The present application implements a smart gate and/or smart gate system that can automatically open in response to detecting expected arrival events such as deliveries or services. In particular, the smart gate and/or smart gate system may recognize a vehicle associated with an expected arrival event such as a truck with a particular logo associated with a delivery. The smart gate and/or smart gate system may also refer to schedules, time windows, or time intervals to accurately open for expected arrival events. The smart gate and/or smart gate system may also have wireless communication capabilities that allows it to communicate with, for example, a user device of a manager of the gate, servers associated with traffic, traffic data, or traffic surveillance, and a server associated with an expected arrival event such as a server of a company managing or organizing a delivery. The smart gate may also execute exception handling procedure in the event that a vehicle or person associated with an expected arrival event is late or delayed.

While the present application discloses in length a smart gate and/or smart gate system that can automatically open in response to detecting expected arrival events. An inverse implementation may also be implemented using the same or similar technology, innovations, or inventions. That is, the same or similar technology may be used to implement a gate or smart gate that automatically closes upon detecting an unauthorized vehicle. For example, the gate or smart gate may be in a default open state and upon detecting or recognizing the unauthorized vehicle, the gate or smart gate may close. Thus, it may be understood that the present application is related to a smart gate that automatically actuates upon identifying an authorized or unauthorized vehicle.

Reference is made to FIG. 1 which is a front view of an example smart gate 100 for automatically opening upon recognition of a vehicle associated with an expected arrival event. As shown in FIG. 1, the smart gate 100 may have moveable barriers 102, axes 104, one or more sensors 110, and a light source 120.

In the case of FIG. 1, the smart gate 100 is shown having two moveable barriers 102. The moveable barriers 102 may prevent an entrant such as a vehicle 130 or a driver 150 from passing beyond the smart gate when the smart gate 100 is closed (as is shown in FIG. 1). When the moveable barriers 102 are moved or the smart gate 100 opens, the vehicle 130 or the driver 150 may pass through the smart gate 100.

The smart gate 100 is also shown having two axes 104. Each one of the axes 104 are coupled to the moveable barriers 102. The moveable barriers 102 may rotate along the axes 104 for the smart gate 100 to open. In some embodiments, the moveable barriers may rotate toward the smart gate 100 relative to the front view. In some embodiments, the moveable barriers may rotate away from the smart gate 100 relative to the front view.

While not depicted in FIG. 1, in some embodiments, the smart gate 100 may open by lifting up the moveable barriers 102 or a single moveable barrier. In other embodiments, the smart gate 100 may open by sliding the moveable barriers 102 or a single moveable barrier. In other embodiments, the smart gate 100 may open by sinking the moveable barriers 102 or a single moveable barrier into the ground or floor.

FIG. 1 also shows one or more sensors 110 deployed on the smart gate 100. While FIG. 1 shows three sensors 110, in actuality there may be a greater or lesser number of sensors. The sensors 110 may include light sensors, heat sensors, temperature sensors, chemical sensors, air quality sensors, smoke sensors, pressure sensors, touch sensors, motion sensors, cameras, video cameras, image capturing devices, and video capturing devices. While FIG. 1 shows the sensors 110 deployed on the smart gate, in some embodiments, some of the sensors 110 may be deployed around the smart gate. For example, some of the sensors may be on the ground or floor. In another example, in the event that the smart gate 100 is located on a path, passageway, or corridor with a wall, some of the sensors 110 may deployed on the wall. In embodiments where some of the sensors 110 are not deployed directly on the smart gate 100, the smart gate 100 may use a wireless connection to control or access data from the sensors 110. The smart gate may receive and monitor data from the sensors 110.

In some embodiments, the sensors 110 include image capturing devices. Some of the image capturing devices may be used to capture one or more images of the vehicle 130. The smart gate 100 may process these images and recognize a corresponding model or vehicle model of the vehicle 130. Additionally or alternatively, the smart gate 100 may associate the vehicle 130 or the model of the vehicle 130 with the expected arrival event. The smart gate 100 may subsequently open. In some embodiments, the smart gate 100 may process the captured images and recognize a logo, such as a logo 140, on the vehicle 130. Additionally or alternatively, the smart gate 100 may associated the logo 140 with the expected arrival event and subsequently open.

In some embodiments, the image capturing devices may capture one or more images of a face of a driver of the vehicle such as the driver 150. The smart gate 100 may process these images of the face and recognize the face using facial recognition software. The recognition of the face may provide additional security to the smart gate 100. In some embodiments, in the event that the smart gate 100 fails to recognize the face of the driver 150, the smart gate may send a notification to a user device (not shown in FIG. 1) of a manager or operator of the smart gate 100 for human review.

In some embodiments, the image capturing devices may capture one or more images of the driver 150. The smart gate 100 may process, using image processing software, these images of the driver 150 and recognize a uniform worn by the driver 150. The recognition of the uniform may provide additional security to the smart gate 100. In some embodiments, in the event that the smart gate fails to recognize the uniform worn by the driver 150, the smart gate may send a notification to a user device (not shown in FIG. 1) of a manager or operator of the smart gate 100 for human review.

In some embodiments, the sensors 110 may include depth-sensing cameras such as Light Detection and Ranging cameras (LiDAR) or stereo vision cameras. In some embodiments, the smart gate 100 may use these depth-sensing cameras to count a number of occupants of the vehicle 130. Additionally or alternatively, the smart gate 100 may confirm that the counted number of occupants is an expected number of occupants. In some embodiments, in the event that the smart gate counts an unexpected number of occupants, the smart gate may send a notification to a user device (not shown in FIG. 1) of a manager or operator of the smart gate 100 for human review.

FIG. 1 also shows the smart gate 100 including a light source 120. In some embodiments, the smart gate 100 may detect from data received from the sensors 110 that the vehicle 130 is near the smart gate 100. The smart gate 100 may further determine from the sensor data that an area around the smart gate 100 is dark or has a brightness measure below a lighting threshold related to an accuracy measure. In response, the smart gate 100 may cause the light source 120 to light up or turn on. Lighting up or turning on the light source 120 may improve visibility for the driver 150. Lighting up or turning on the light source 120 may also improve the quality or usability of images captured by any image capturing devices. That is, lighting up or turning on the light source 120 may affect or improve the accuracy of image processing on images captured by any image capturing devices. In some embodiments, the smart gate 100 may include multiple light sources and the smart gate 100 may cause at least one of the multiple light sources to light up or turn on.

While not shown in FIG. 1, the smart gate 100 may also have a processor or computer system that operates the smart gate 100 and enables automatic functions such as opening upon recognizing a vehicle model or transmitting notification to a user device of a manager or operator of the smart gate 100.

In some embodiments, the smart gate or processor may perform self-diagnostic operations. For example, the processor may detect, from sensor data received from the one or more sensors, that one of the one or more sensors is performing at a performance level lower than a standard. That is, the sensor may be performing at a quality or level that compromises the accuracy, security or reliability of the smart gate and its operations. In response, the processor may transmit, via wireless communication, a performance level notification to the user device. The performance level notification may indicate that the one of the one or more sensors is performing at the lower performance level. For example, the performance level notification may include the text message “Quality of images from camera 2 is compromised. Repair or replace.” In some embodiments, the processor may be able determine the cause of the lower level of performance and notify the manager or operator of the smart gate via the performance level notification. For example, the performance level notification may include the text message “The lens of camera 2 needs to be replaced.” In another example, the performance level notification may include the text message “Sensor 4 needs a cleaning.”

Figure 1A:
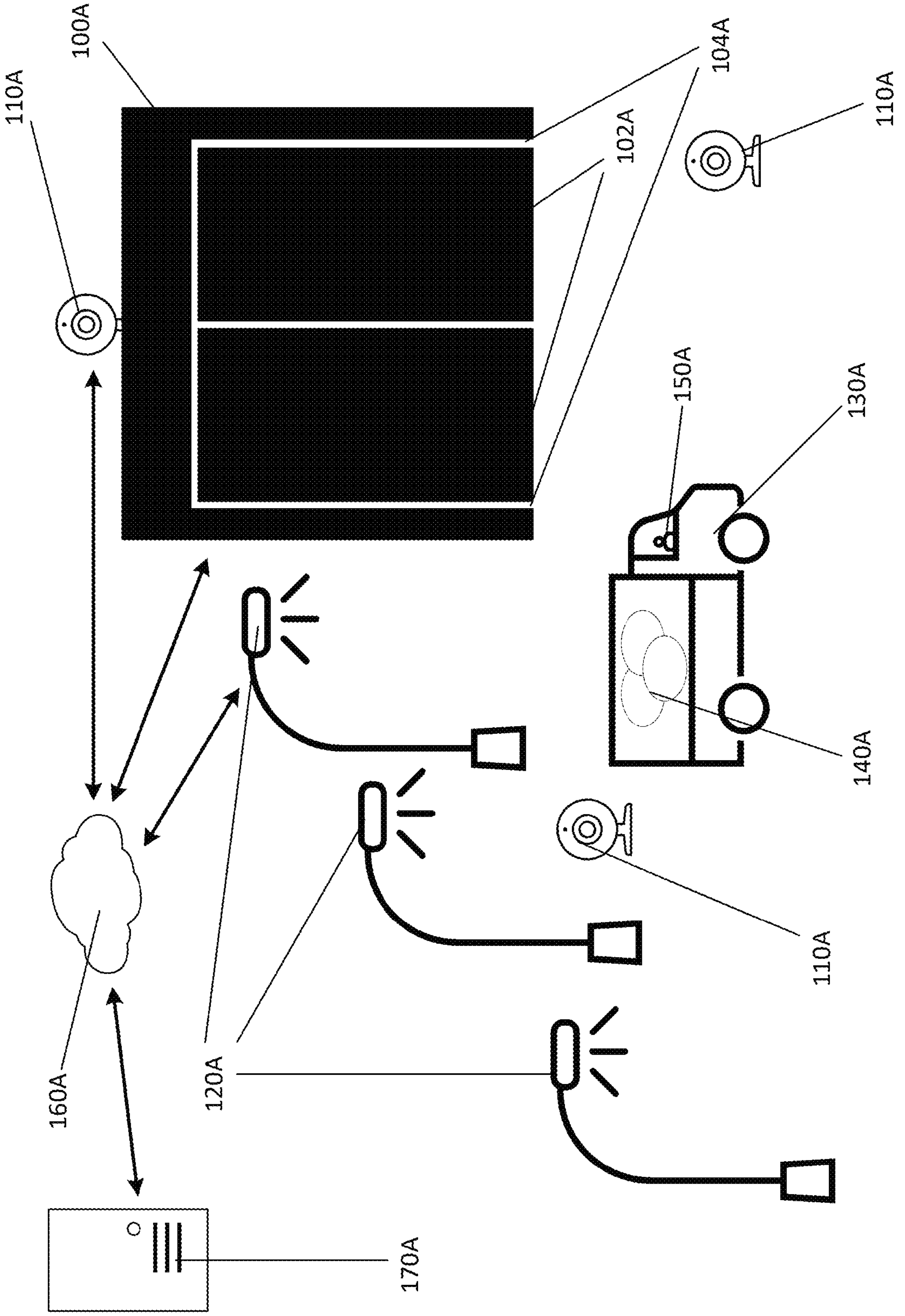
FIG. 1A is a front view of another example smart gate and a vehicle.

Reference is made to FIG. 1A which is a front view of another example smart gate 100A for automatically opening upon recognition of a vehicle associated with an expected arrival event. As shown in FIG. 1A, the smart gate 100A has moveable barriers 102A and axes 104A. The moveable barriers 102A and the axes 104A operate and function similarly to their like-numbered counterparts in FIG. 1, the moveable barriers 102 and the axes 104.

The smart gate 100A does not have a processor or computer system that operates the smart gate 100A. Instead, FIG. 1A shows a remote server or computer system 170A. The computer system 170A may be wireless connected to the smart gate 100A via the network 160A The network 160A may be a cellular network such as a WiFi network, a local area network (LAN), a wide area network (WAN), a 5G network, or a combination thereof. The computer system 170A more operate or instruct the smart gate 100A via instructions sent to the smart gate 100A via the network 160A. That is, the computer system 170A may cause the smart gate 100A to open by transmitting instructions to open to the smart gate 100A via the network 160A. Likewise, the computer system 170A may cause the smart gate 100A to close by transmitting instructions to close to the smart gate 100A.

The computer system 170A may also wirelessly communicate with sensors 110A via the network 160A. In some embodiments, the computer system 170A may communicate or connect with all or some of the sensors 110A. In other embodiments, the computer system 170A may communicate or connect with an intermediate computer (not shown in FIG. 1A) that is in communication with or connected to all or some of the sensors 110A. The sensors 110A may operate similarly to their like-numbered counterparts in FIG. 1, the sensors 110A. In the case of the sensors 110A, however, the computer system 170A may receive and monitor data from the sensors 110A. Likewise, vehicle model recognition, logo recognition, facial recognition, occupant counting, uniform recognition, and any other method, algorithm, program, process, or procedure related to operation of the smart gate 100A may occur or execute at the computer system 170A.

The computer system 170A may also wireless communicate with light sources 120A. In some embodiments, the computer system 170A may communicate or connect with all or some of the light sources 120A. In other embodiments, the computer system 170A may communicate or connect with an intermediate computer (not shown in FIG. 1A) that communicates with or connects to all or some of the light sources 120A. The computer system 170A may transmit instructions to the light sources 120A to turn on or off upon detecting the presence of a vehicle 130A from data received from the sensors 110A.

Figure 2:
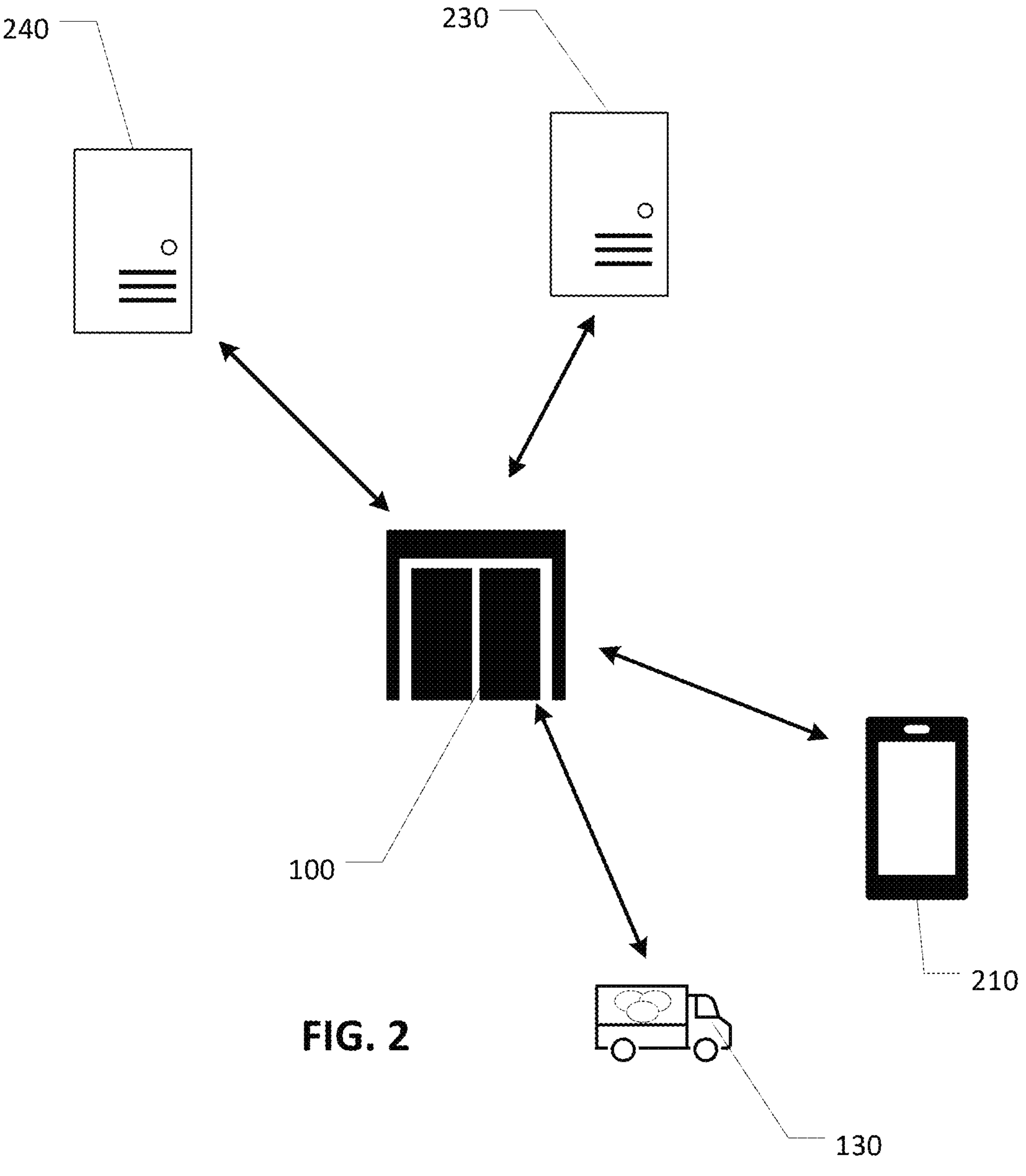
FIG. 2 is a diagram illustrating wireless network connections of an example smart gate or smart gate system.

Reference is now made to FIG. 2 which is a simplified diagram illustrating wireless network connections of an example smart gate 100 (see FIG. 1). More particularly, the smart gate 100 is shown having wireless connections with a vehicle 130 (see FIG. 1), a user device 210, a first server 230, and a second server 240. The wireless connections may be implemented over a cellular network such as a WiFi network, a LAN, a WAN, a 5G network, or a combination thereof. Further, each connection shown in FIG. 2 may be implemented over a different network. Additionally or alternatively, some of the connections shown in FIG. 2 may share the same network.

FIG. 2 shows the smart gate 100 wireless connecting to the vehicle 130. More specifically, the vehicle 130 may have an on-board system that the smart gate 100 can transmit and receive messages from over a network. In the event that the vehicle 130A arrives outside of a time interval associated with an expected arrival event, the smart gate 100 may transmit a message to the on-board system of the vehicle 130A. The transmitted message may further ask for an explanation for the lateness or delay from a driver or occupant of the vehicle 130A. The on-board system may transmit a voice message from the driver or occupant to the smart gate 100. In some embodiments, the smart gate 100 may use natural language processing (NLP) or a NLP machine learning model to determine if the voice message provides a valid reason or excuse for the delay and subsequently open.

FIG. 2 also shows the smart gate 100 wireless connecting to the user device 210. The user device may be used or held by a manager or operator of the smart gate 100. For example, the user of the user device 210 may be a security guard to a building that has the smart gate 100 installed. In another example, the user of the user device 210 may be a resident of a home with the smart gate 100 installed. In some embodiments, the smart gate 100 may transmit notifications or messages to the user device 210. For example, upon detecting the arrival of the vehicle 130, the smart gate may transmit a notification to the user device 210 wherein the notification indicates that the vehicle 130 arrived at the smart gate 100. In another example, the smart gate 100 may transmit, to the user device 210, an entry request for the vehicle 130. In some embodiments, the smart gate 100 may receive notifications or messages from the user device 210. For example, the smart gate 100 may receive, from the user device 210, a confirmation message or permission message in response to the entry request.

While FIG. 2 shows the smart gate 100 wireless connecting to the user device 210, in other embodiments, the smart gate 100 may connect to the user device 210 using a non-wireless connection. For example, the smart gate 100 may send and receive messages or notifications to and from the user device 210 using a wired connection. In another example, the user device 210 may be coupled or operatively connected to the smart gate 100.

FIG. 2 also shows the smart gate 100 connecting to the first server 230. The first server 230 may be a server associated with the vehicle 130. For example, the vehicle 130 may be a delivery truck for a parcel service and the first server 230 may be a server associated with the same parcel service. In some embodiments, the smart gate 100 may transmit and receive messages from the first server 230 for the purposes of estimating an expected arrival time for the vehicle 130. For example, the smart gate 100 may transmit a request for an estimated arrival time to the first server 230. The first server 230 may transmit a response message back to the smart gate 100 wherein the response message includes an estimated arrival time of the vehicle 130. In another example, the smart gate 100 may transmit a request for a location or coordinates of the vehicle 130. The first server 230 may transmit a response message back to the smart gate 100 wherein the response message includes a location or coordinates of the vehicle 130. The smart gate may calculate or estimate an expected arrival time for the vehicle 130 based on the location or coordinates.

FIG. 2 also shows the smart gate 100 connecting to the second server 240. The second server may be a server can provide traffic data to the smart gate 100. For example, after receiving location or coordinates of the vehicle 130 from the first server 230, the smart gate 100 may transmit, to the second server 240, a request for traffic data related to a route from the location or coordinates to the smart gate 100. The second server 240 may transmit back the requested traffic data. The smart gate 100 may then use the traffic data to calculate or estimate an expected arrival time for the vehicle 130.

Figure 2A:
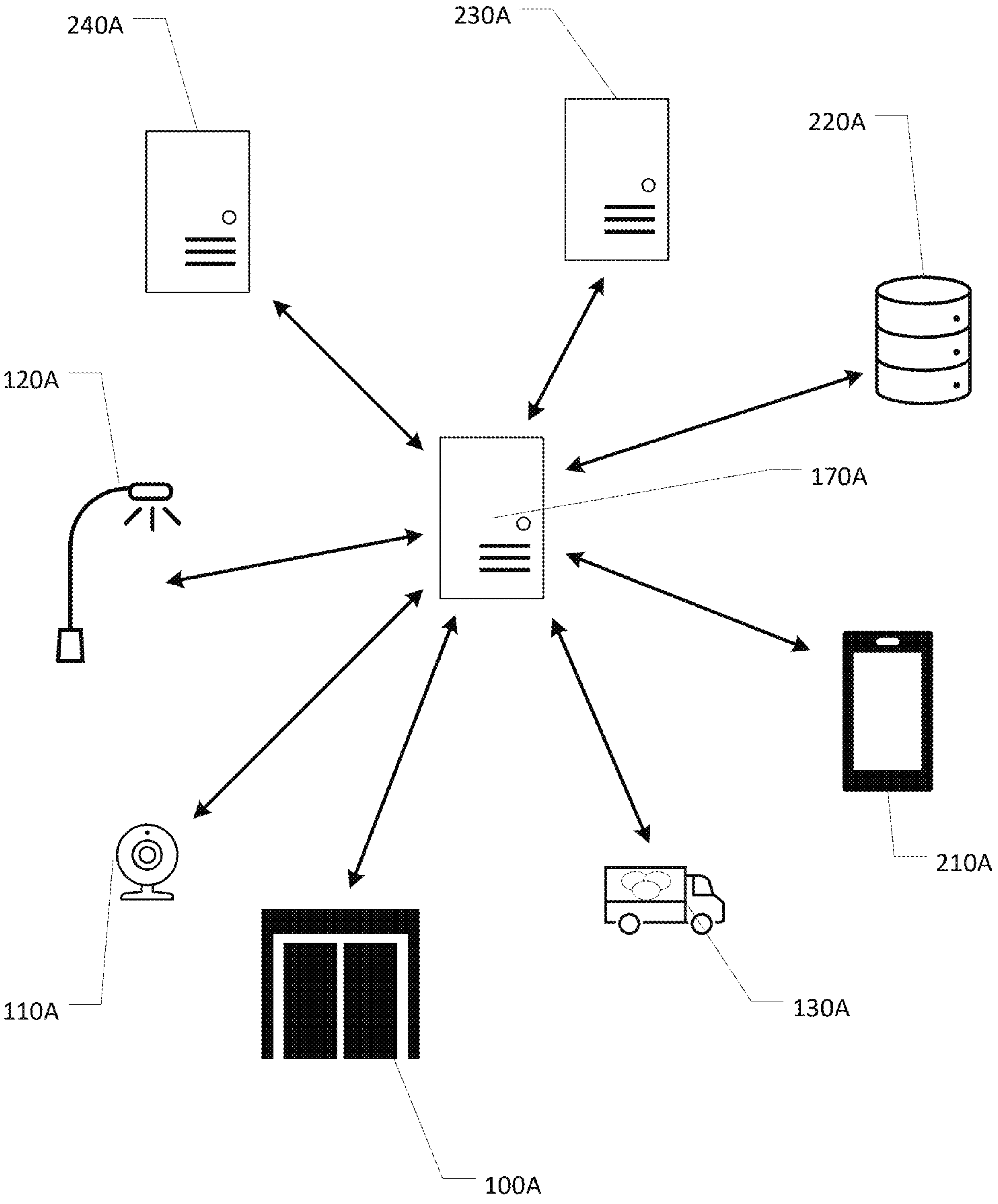
FIG. 2A is a diagram illustrating wireless network connections of an example computer system connected to a smart gate.

Reference is now made to FIG. 2A which is a simplified diagram illustrating wireless network connections of an example computer system 170A (see FIG. 1A) that operates a smart gate 100A. More particularly, the computer system 170A is shown having wireless connections with the smart gate 100A, a sensor or plurality of sensors 110A (see FIG. 1A), a light source or plurality of light sources 120A (see FIG. 1A), a vehicle 130 (see FIG. 1A), a user device 210A, a database 220A, a first server 230A, and a second server 240. The wireless connections may be implemented over a cellular network such as a WiFi network, a LAN, a WAN, a 5G network, or a combination thereof. Further, each connection shown in FIG. 2A may be implemented over a different network. Additionally or alternatively, some of the connections shown in FIG. 2A may share the same network.

FIG. 2A shows the computer system 170A connecting to the smart gate 100A. The computer system 170A may use the wireless connection with the smart gate 100A to control the operations of the smart gate 100A. Specifically, the computer system 170A may transmit instructions to open or close to the smart gate 100A.

FIG. 2A also shows the computer system 170A connecting to the sensors 110A. The computer system 170A may use the wireless connection with the sensors 110A to receive or obtain sensor data related to the smart gate 100A. For example, the computer system 170A may receive images or image data of the vehicle 130A from the sensors 110A over the network connection. The computer system 170A may subsequently process the received images to determine if the vehicle 130A is associated with an expected arrival event.

FIG. 2A also shows the computer system 170A connecting to the light sources 120A. The computer system 170A may use the wireless connection with the light sources 120A to control the light sources 120A. For example, in the event that the computer system 170A determines from data received from the sensors 110A that an area around the smart gate 100A is dark or dimly lit, the computer system 170A may transmit instructions to turn on to the light sources 120A. In another example, in the event that the computer system 170A determines from data received from the sensors 110A that there are no vehicles present near the smart gate 100A, the computer system 170A may transmit instruction to turn off to the light sources 120A.

FIG. 2A also shows the computer system 170A connecting to the vehicle 130A or an on-board system of the vehicle 130A. The vehicle 130A operates and functions similarly to the vehicle 130 (see FIG. 2).

FIG. 2A also shows the computer system 170A connecting to the user device 210A. The user device 210A operates and functions similarly to the user device 210 (see FIG. 2).

FIG. 2A also shows the computer system 170A connecting to the database 220A. The database 220A may store data such as a list, plurality, or collection of expected arrival events. Upon detecting vehicle 130A, from data received from the sensors 110A, the computer system 170A may retrieve data related to the expected arrival events from the database 220A. The computer system 170A may use this stored data to determine if the vehicle 130A is associated with an expected arrival event. The database 220A may also store historical data related to recurrent arrival associated with a series of expected arrival events. For example, the vehicle 130A may be associated with a weekly garbage collection service. The database 220A may store the past arrival times of the vehicles associated with the weekly garbage collection service. Referring to this historical data, the computer system 170A may calculate or estimate an expected arrival time for the vehicle 130A in association with the next arrival associated with the garbage collection service.

FIG. 2A also shows the computer system 170A connecting to the first server 230A. The first server 230A operates and functions similarly to the first server 230 (see FIG. 2).

FIG. 2A also shows the computer system 170A connecting to the second server 240A. The second server 240A operates similarly to the second server 240 (see FIG. 2).

Figure 3:
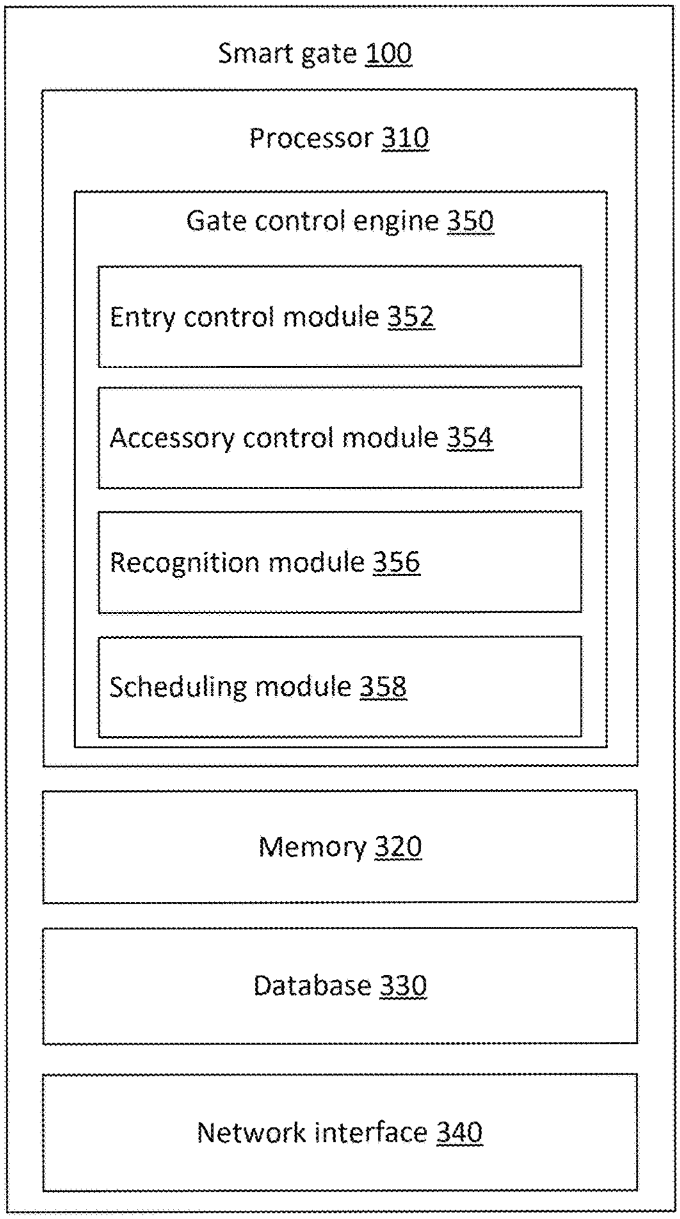
FIG. 3 is a block diagram illustrating a smart gate system or a computer system of a smart gate.

Reference is made to FIG. 3 which is a block diagram illustrating the computer-implemented aspects of an example smart gate 100 (see FIG. 1). That is, FIG. 3 may be understood to be a block diagram illustrating a smart gate controller. As shown in FIG. 3, the smart gate 100 may include at least one processor 310 and a memory 320. The at least one processor 310 may be a central processing unit, a microprocessor, a signal processor, an application-specific integrated circuit (ASIC), a field-programmable gate array (FPGA), a dedicated logic circuity, a dedicated artificial intelligence processor unit, a graphic processing unit (GPU), a tensor processing unit (TPU), a neural processing unit (NPU), a hardware accelerator, or combinations thereof. The memory 320 may include volatile or non-volatile memory (e.g. a flash memory, a random access memory, (RAM), and/or a read-only memory (ROM)). The memory 320 may be considered a computer-readable storage medium storing computer-executable instructions or a memory storing computer-executable instructions. The memory 320 may store instructions for execution by the at least one processor 310. The memory 320 may be coupled to the at least one processor 310.

Although FIG. 3 shows a single instance of each component, there may be multiple instances of each component in the smart gate 100. Further, although the smart gate 100 is illustrates as a single block, the smart gate 100 may be a single physical machine or device (e.g. implemented as a single computing device, such as a single workstation, single end user device, single server, etc.), or may comprise a plurality of physical machines or devices (e.g., implemented as a server cluster). For example, the smart gate 100 may represent a group of servers or cloud computing platform providing a virtualized pool of computing resources (e.g., a virtual machine, a virtual server).

The memory 320 may contain software, programming, or computer-executable instructions which, when executed by the processor 310, perform various smart gate functions. In the embodiment illustrated in FIG. 3, the processor 310 has a gate control engine 350 to execute smart gate functions. The gate control engine 350 may be in communication with the memory 320. The gate control engine 350 is shown including an entry control module 352, an accessory control module 354, a recognition module 356 and a scheduling module 358.

The entry control module 352 allows the processor 310 to control, command, or instruct a part of the smart gate 100 that acts as an entrance, entryway, or barrier to an oncoming object, person, or vehicle. That is, the processor 310 may cause the smart gate 100 to open or close. In some embodiments, the smart gate 100 may open or close by sliding a barrier. In some embodiments, the smart gate 100 may open or close by rotating a barrier around an axis. In some embodiments, the smart gate 100 may open or close by lifting a barrier. In some embodiments, the smart gate 100 may open or close by sinking a barrier into a ground or floor.

The accessory control module 354 allows the processor 310 to control, command, or instruct objects or items that may be considered accessories of the smart gate 100. An accessory may be, for example, sensors or light sources deployed on the smart gate 100. In some embodiments, the processor 310 may control sensors deployed on the smart gate 100. For example, the processor may obtain or receive data from the sensors including images. In another example, in the case that some of the sensors are image or video capturing devices, such as cameras, the processor may control panning, tilting, or zooming controls of the image or video capturing devices. In some embodiments, the processor may control a light source deployed on the smart gate 100. For example, the processor may cause the light source to turn on or off.

The recognition module 356 allows the processor 310 to recognize or identify vehicles near or in front of the smart gate 100. In some embodiments, the processor 310 may use a machine leaning model to identify a model or vehicle model of a vehicle. For example, the machine learning model may take in, as input, one or more images obtained from sensors or cameras deployed around the smart gate 100 and output a model or vehicle model or data representing a model or vehicle model. The processor 310 may search a list or collection of expected arrival events, from a storage such as the database 330, for an expected arrival event that matches or corresponds to the outputted model. The processor 310 may consider or classify the vehicle as "recognized" if the processor 310 finds a matching or corresponding expected arrival event.

In some embodiments, the processor 310 may use a machine learning model to identify a logo on a vehicle. For example, the machine learning model may take in, as input, one or more images obtained from sensors or cameras deployed on the smart gate 100 and output a logo or data representing a logo. The processor 310 may search a list or collection of expected arrival events, from a storage such as the database 330, for an expected arrival event that matches or corresponds to the outputted logo. The processor 310 may consider or classify the vehicle as "recognized" if the processor 310 finds a matching or corresponding expected arrival event.

The recognition module 356 may also allow the processor 310 to recognize faces. In some embodiments, the processor 310 may use a machine learning model to identify a face of a driver of a vehicle. For example, the machine learning model may take in, as input, one or more images of the face of the driver obtained from sensors or cameras deployed around the smart gate 100 and output, in the event that the face of the driver matches an authorized or pre-approved face with a similarity level exceeding a threshold, the authorized face or data representing the authorized face. The authorized face may be data representing a face associated with an expected arrival event. The authorized face may be stored in a storage, such as the database 330, in association with an expected arrival event. In some embodiments, a service provider associated with the vehicle or expected arrival event may provide a list or collection of authorized faces. For example, if the expected arrival event is related to a garbage collection service provided by a garbage collection company, the company may provide a list of faces corresponding to their garbage collectors.

The recognition module 356 may also allow the processor 310 to recognize uniforms. In some embodiments, the processor 310 may use a machine learning model to identify a uniform of a driver of a vehicle. For example, the machine learning model may take in, as input, one or more images of a driver of the vehicle obtained from sensors or cameras deployed around the smart gate 100 and output, in the event that clothing worn by the driver matches an authorized uniform with a similarity level exceeding a threshold, the authorized uniform or data representing the authorized uniform. The authorized uniform may be data representing a uniform associated with an expected arrival event. The authorized uniform may be stored in a storage, such as the database 330, in association with an expected arrival event.

In some embodiments, the processor 310 may use a machine learning model that is a neural network or convolutional neural network (CNN) to identify or recognize vehicles.

In some embodiments, the smart gate 100 may be a single installation of a smart gate with vehicle recognition capabilities out of multiple installations. In some embodiments, federated learning may be used across these installations to train any machine learning models that are used or run by the processor 310 or smart gate 100.

In some embodiments, the processor 310 may use optical character recognition (OCR) to read a license plate of a vehicle near or in front of the smart gate 100. For example, the processor 310 may apply OCR software, programming, or computer-executable instructions to an image of the vehicle captured by an image capturing device deployed on the smart gate 100. The application of OCR may result in a text output representing the license plate number of the vehicle. The processor 310 may search for a matching license plate number in a list of authorized license plate numbers. The list of authorized licenses plates may be stored in a storage such as the database 330.

The scheduling module 358 may allow the processor 310 to schedule or determine a time interval, time slot, or time window associated with an expected arrival event. For example, for an expected arrival event corresponding to a delivery of materials to a factory, the processor 310 may transmit a message to a server associated with the deliverer wherein the message requests an estimated arrival time for the delivery. Upon receiving, from the server, an estimated arrival time for the delivery, the processor 310 may associate a time interval with the expected arrival event. Additionally or alternatively, the processor 310 may update an associated time interval. The processor may, for example, determine that the time interval is the estimated arrival time plus or minus 30 minutes. In another example, the processor 310 may transmit a message to a server associated with the deliverer wherein the message requests for data representing a current location of the vehicle. Upon receiving, from the server, data representing the current location of the vehicle and subsequently obtaining data related to traffic on a route from the current location to the smart gate 100, the processor 310 may calculate or determine an estimate arrival time. The processor 310 may then determine a time interval associated with the expected arrival event. In another example, the processor 310 may determine an ideal time for a delivery. The processor 310 may then transmit a message to a server associated with the delivery to make the delivery at the ideal time. Upon receiving a confirmation message, the processor 310 may set the time interval to reflect the ideal time.

FIG. 3 further shows the smart gate 100 including the database 330. While FIG. 3 shows the database 330 as part of the smart gate 100, in same embodiments, the database 330 may be physically separate from the smart gate 100. In these embodiments, the processor 310 or the smart gate 100 may obtain or receive data from the database 330 via wireless communication over a network.

In some embodiments, the database 330 may store a list or collection of expected arrival events. In some embodiments, expected arrival event may be stored as a tuple comprising a at least some of a time interval, a logo, a model or vehicle model, and a service provider or expected entrant. The database 330 may further store a list of authorized or pre-approved faces associated with a service provider or expected entrant. The database 330 may further store a list of authorized or expected uniforms associated with a service provider or expected entrant. The database 330 may also store a delivery history or service history in association with a service provider or expected entrant. In the case of an expected arrival event in a series of recurring expected arrival events, the processor 310 may consider or refer to the delivery history or service history to estimate or determine a time interval in association with the expected arrival event.

FIG. 3 shows the smart gate 100 including the network interface 340. The network interface 340 facilities wired or wireless communication with an external system or network (e.g., cellular, an intranet, the Internet, a peer-to-peer (P2P) network, a WAN, a LAN). In some embodiments, the smart gate 100 may use the network interface 340 to communicate with a first server associated with the expected arrival event. For example, if the expected arrival event corresponds to a delivery, the processor 310 may transmit a request to the first server that the delivery occur at a chosen time. In another example, the processor 310 may receive an estimated arrival time from the first server. In another example, the processor 310 may receive location data of the vehicle from the first server.

In some embodiments, the smart gate 100 may use the network interface 340 to communicate with a second server associated with traffic. The processor 310 or the smart gate 100 may communicate with the second server to receive traffic data in order to calculate or determine an estimate arrival time for a vehicle.

In some embodiments, the smart gate 100 may use the network interface 340 to connect with a vehicle, or more specifically, an on-board system of the vehicle. The processor 310 may use this connection to, for example, receive a reason or explanation for a delayed arrival of the vehicle relative to a time interval associated with an expected arrival event.

Figure 4:
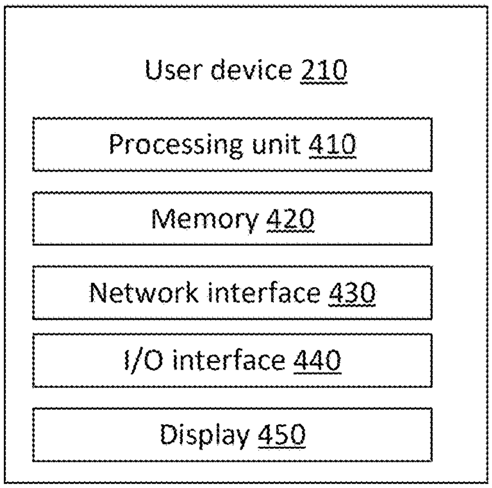
FIG. 4 is a block diagram illustrating an example user device connected to a smart gate or smart gate system.

Reference is made to FIG. 4, which illustrates in block diagram form an example user device 210 (also seen in FIG. 2). The user device 210 may be any electronic device capable of displaying a user interface. Examples of suitable electronic devices include mobile devices (e.g., smartphones, tablets, laptops, etc.), among others. Example components of the user device 210 are now described, which are not intended to be limiting. It should be understood that there may be different implementations of the user device 210.

The user device 210 includes at least one processing unit 410 such as a processor, microprocessor, an application-specific integrated circuit (ASIC), a field-programmable gate array (FPGA), a dedicated logic circuitry, a graphics processing unit (GPU), a central processing unit (CPU), a dedicated artificial intelligence processor unit, or combinations thereof.

The user device 210 includes at least one memory 420, which may include a volatile or non-volatile memory (e.g., a flash memory, a random access memory (RAM), and/or a read-only memory (ROM)). The memory 420 may store instructions for execution by the processing unit 410.

The user device 210 includes at least one network interface 430 for wired or wireless communication with an external system or network (e.g., a push-to-talk network, cellular, an intranet, the Internet, a P2P network, a WAN, a LAN). In some embodiments, the user device 210 may be able to communicate with a smart gate such as the smart gate 100 (see FIG. 1 and FIG. 3). In some embodiments, such communication may be wireless. In other embodiments, such communication may be wired.

The user device 210 also includes at least one input/output (I/O) interface 440, which interfaces with input and output devices. In some examples, the same component may serve as both an input and output device (e.g., a display 450 may be a touch-sensitive display). The user device 210 may include other input devices (e.g., buttons, microphone, touchscreen, keyboard, etc.) and other output devices (e.g., speaker, vibration unit, etc.).

The user device 210 may also include a display 450. In some embodiments, the display 450 may display a user interface for a manager or operator of a smart gate to interact with or control the smart gate. In some embodiments, the manager or operator may cause the smart gate to store data related to an expected arrival event via the user interface. For example, after ordering the delivery of a product, the manager may, through the user interface, input details such as expected time of delivery and deliverer of the product. The smart gate may store these inputted details in association with a new expected arrival event. In some embodiments the manager may request that a delivery be made at a specific time through the user interface. Upon receiving the request from the manager, the smart gate may communicate with a server associated with the deliverer to schedule the delivery for the requested time. In some embodiments, the manager may cause the smart gate to open via the user interface. For example, the user interface may display an "open" and a "close" button on the display 450. In another example, the smart gate may send a message to the user device 210 asking for permission of entry for a vehicle. In this example, display 450 may display an "allow entry" button which, when tapped, will cause the smart gate to open.

In some embodiments, the user device 210 receives notifications from the smart gate. For example, once a vehicle leaves a property with the smart gate installed, the smart gate may send a notification to the user device 210 wherein the notification contains information related to the amount of time the vehicle, or service provider associated with the vehicle, spent at the property.

Figure 5:
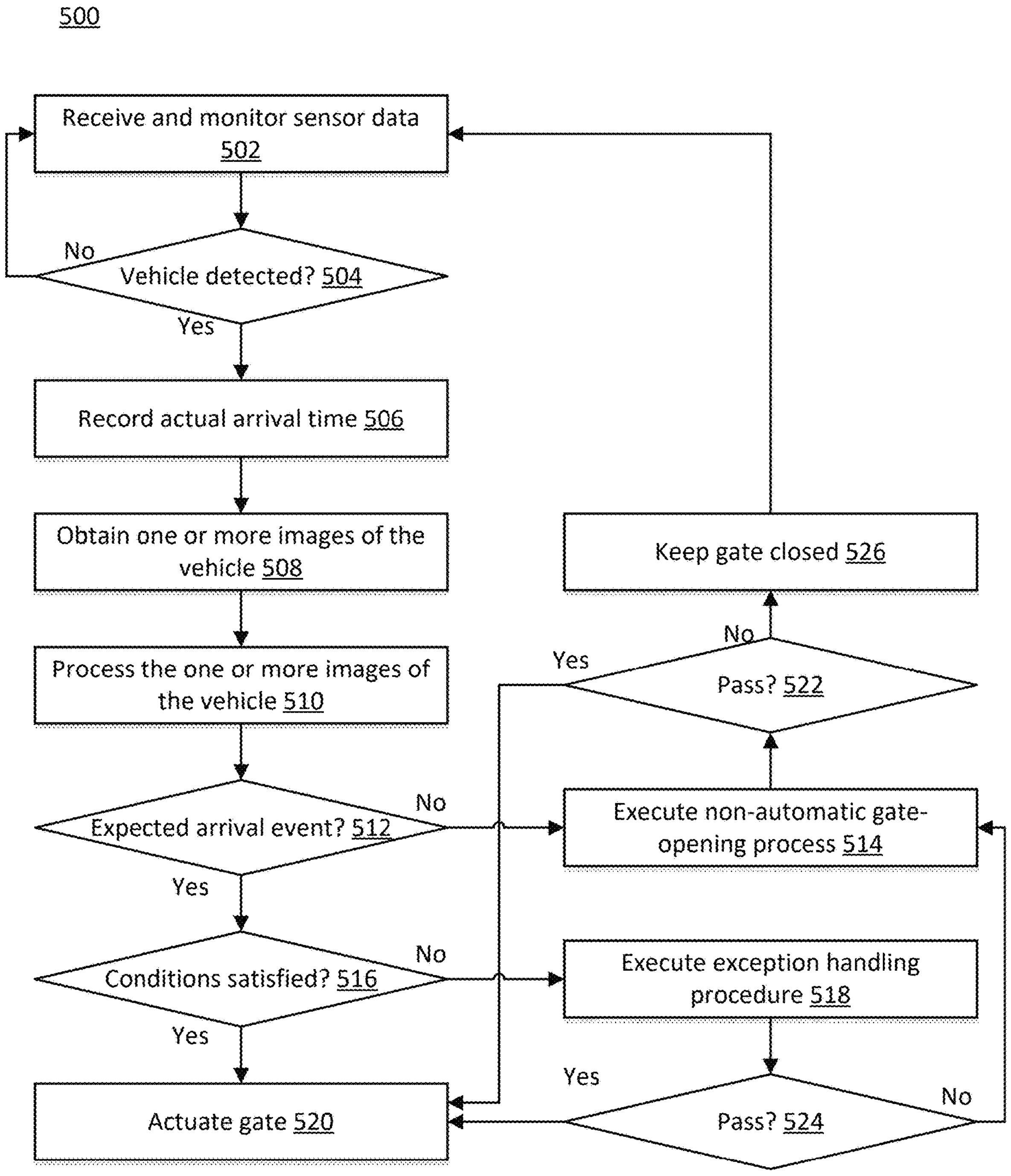
FIG. 5 shows, in flowchart form, a method allowing a smart gate to automatically open upon recognition of a vehicle.

Reference is now made to FIG. 5 which shows in flowchart form, a method 500 allowing a smart gate to automatically open upon recognition of a vehicle. The method 500 may be performed by a smart gate of a property or facility such as the smart gate 100 as shown in FIG. 3. In other embodiments, the method 500 may be performed by a computer system or smart gate system controlling a smart gate such as the computer system 170A as shown in FIG. 1A. The smart gate or computer system may comprise a processor and a wireless communication system. In particular, the smart gate or computer system may have a memory storing computer-executable instructions for the processor to execute operation of the method 500.

The method 500 beings with an operation 502. At the operation 502, the processor may receive and monitor sensor data from one or more sensors deployed on the smart gate or around the smart gate. The one or more sensors may include motion sensors, heat sensors, cameras, and video cameras. The sensor data received from the one or more sensors may include motion data, heat data, image data, and video data.

Following the operation, flow control proceeds to a decision 504. At the decision 504, the processor determines from the sensor data whether a vehicle has arrived at or in front of the smart gate. That is, the processor may detect from the sensor data that a vehicle has arrived at or in front of the smart gate.

If the processor detects a vehicle at the decision 504, flow control may proceed to an operation 506. At the operation 506, the processor records the time at which the vehicle arrived at or in front of the smart gate. That is, the processor may detect that the vehicle has arrived at the smart gate at an actual arrival time. In the event that the processor does not detect a vehicle at the decision 504, flow control may return to the operation 502 and the processor may continue to receive and monitor sensor data from the one or more sensors.

After the operation 506, flow control may proceed to an operation 508. At the operation 508, the processor may receive or obtain one or more images of the vehicle. In some embodiments, the processor may receive the one or more images from at least a first one of one or more image capturing devices deployed on the smart gate. In some embodiments, the first image capturing device may be one of the one or more sensors. In some embodiments, the one or more images of the vehicle may include multiple views of the vehicle. For example, the processor may obtain or receive an image showing a front view of the vehicle, an image showing a side view of the vehicle, an image showing a top view of the vehicle, and an image showing a rear view of the vehicle.

In some embodiments, the processor may obtain or receive the one or more images by first transmitting instructions to at least a first image capturing device to capture images of the detected vehicle. The images may be transmitted back to the processor, smart gate, smart gate system, or computer system upon capture.

After the operation 508, flow control may proceed to an operation 510. At the operation 510, the processor processes the one or more images of the vehicle. For example, the processor may input at least one of the one or more images into a machine learning model in order to determine if the processor recognizes the vehicle. For example, the machine learning model may output that the vehicle is of a particular model or vehicle model. That is, the processor may use the one or more images of the vehicle as input to a vehicle recognition machine learning model. Further, the processor may determine, for example via output of the vehicle recognition machine learning model, that the vehicle belongs to a class of vehicles. In another example, the machine learning model may output that the vehicle displays a particular logo or recognized logo. That is, the processor may use the one or more images of the vehicle as input to a logo recognition machine learning model. Further, the processor may recognize or determine as known, for example via output of the logo recognition machine learning model, a logo on the vehicle.

In some embodiments, the processor may use OCR to recognize a license plate number of the vehicle.

After the operation 510, flow control may proceed to a decision 512. At the decision 512, the processor may determine if the vehicle is associated with an expected arrival event. In some embodiments, an expected arrival event may be data or a collection of data indicating or representing that a particular vehicle or authorized vehicle is scheduled to or expected to arrive at the property or facility during a time window or time interval. The time window or time interval may be defined by a first time and a second time wherein the first time is earlier than the second time. In some embodiments, it may be said that an expected arrival event is associated with a time interval defined by the first time and the second time. The expected arrival event may also include or be associated with conditions such as a driver of the vehicle being a particular person or authorized person, a driver of the vehicle wearing a uniform or authorized uniform, a number of occupants of the vehicle, or an authorized license plate number. The actual arrival time of the vehicle coinciding with the time window or time interval may also be a condition.

In some embodiments, the processor may determine that the vehicle is associated with an expected arrival event based on the model, vehicle model, or class of the vehicle. For example, after determining that the vehicle belongs to a class of vehicles via inputting the one or more images into a vehicle recognition machine learning model, the processor may determine that the class is associated with the expected arrival event. That is, data defining or describing the expected arrival event may include the class of the vehicle.

In some embodiments, the processor may determine that the vehicle is associated with an expected arrival event based on a logo displayed on the vehicle. For example, after recognizing a logo on the vehicle via inputting the one or more images into a logo recognition machine learning model, the processor may determine that the logo is associated with an expected arrival event. That is, data defining or describing the expected arrival event may include the logo of the vehicle.

In some embodiments, the processor may determine that the vehicle is associated with an expected arrival event based on a license plate displayed on the vehicle. For example, the processor may determine, using OCR software or programming, a license plate number of the vehicle. The processor may confirm that the license plate number is associated with the expected arrival event or is present in a list, dataset, or whitelist of authorized license plate numbers associated with the expected arrival event. In some embodiments, a service provider associated with the expected arrival event may provide the list of authorized license plate numbers to the processor, smart gate, smart gate system, or computer system. In some embodiments, the service provider may provide a list of authorized license plate numbers via transmission over a wireless network from a server associated with the service provider.

If the processor determines that the vehicle is associated with an expected arrival event at the decision 512, flow control may proceed to a decision 516. At the decision 516, the processor may determine if the conditions associated with the expected arrival event have been sufficiently satisfied. The processor may determine that the conditions have been sufficiently satisfied based at least in part on the actual arrival time and the time interval. That is, the processor may determine that the conditions have been satisfied if the actual arrival time is 1) after or equal to the first time and 2) before or equal to the second time.

In some embodiments, the conditions associated with the expected arrival event may include that a driver or occupant of the vehicle is an authorized person. For example, the processor may receive or obtain, from at least a second one of the one or more image capturing devices, one or more images of, or showing, a face of the driver or occupant of the vehicle. The processor may process the one or more images of the face, for example using machine learning, image processing, or computer vision, to determine that the face of the driver or occupant is the face of an authorized person. That is, the processor may determine that driver or occupant is an authorized person. In some embodiments, if the expected arrival event is associated with a service provided by a service provider, the service provider may provide a face dataset including faces of authorized persons to the processor. In some embodiments, the processor may receive the face dataset via wireless communication with a server associated with the service provider. In some embodiments, the processor may receive the face dataset by interacting with an application programming interface (API) provided by the service provider.

In some embodiments, the conditions associated with the expected arrival event may include that a driver or occupant of the vehicle is wearing a uniform associated with the expected arrival event or an authorized uniform. For example, the processor may receive or obtain, from at least a second one of the one or more images capturing devices, one or more images of, or showing, clothing worn by the driver or occupant of the vehicle. The processor may process these images, for example using machine learning, image processing, or computer vision, to determine that the driver or occupant is wearing a uniform associated with the expected arrival event. In some embodiments, if the expected arrival event is associated with a service provided by a service provider, the service provider may provide data representative of a uniform associated with the service provider or an authorized uniform to the processor, smart gate, smart gate system, or computer system. In some embodiments, the processor may receive such data via wireless communication with a server associated with the service provider. In some embodiments, the processor may receive the data by interacting with an API provided by the service provider.

In some embodiments, the conditions associated with the expected arrival event may include that the vehicle has a particular number of occupants. For example, the processor may detect, from the sensor data, a number of occupants of the vehicle. Further, the processor may determine that the number of occupants is an expected number of occupants associated with the expected arrival event. In some embodiments, a service provider associated with the expected arrival event may provide the expected number of occupants to the processor, smart gate, smart gate system, or computer system. In some embodiments, the service provider may provide the expected number of occupants via transmission over a wireless network from a server associated with the service provider. In some embodiments, the processor may receive or initiate reception of the expected number of occupants by querying a server associated with the service provider via an API provided by the service provider. In some embodiments, the processor may detect the number of occupants of the vehicle from sensor data received from a LiDAR camera or a stereo vision camera.

In some embodiments, the conditions associated with the expected arrival event may include that the vehicle has an authorized license plate number. For example, the processor may determine, using OCR software or programming, a license plate number of the vehicle. The processor may confirm that the license plate number is associated with the expected arrival event or is present in a list, dataset, or whitelist of authorized license plate numbers associated with the expected arrival event. In some embodiments, a service provider associated with the expected arrival event may provide the list of authorized license plate numbers to the processor, smart gate, smart gate system, or computer system. In some embodiments, the service provider may provide a list of authorized license plate numbers via transmission over a wireless network from a server associated with the service provider. In some embodiments, the processor may receive or initiate reception of the list of authorized license plate numbers by querying a server associated with the service provider via an API provided by the service provider.

In some embodiments, the conditions associated with the expected arrival event may include that the vehicle has an authorized driver and an authorized license plate. For example, the processor may execute a dual authentication process wherein, in any order, the processor 1) recognizes the license plate of the vehicle as an authorized license plate and 2) recognizes the face of the driver as the face of an authorized person. In some embodiments, the license plate may be found in a list of authorized license plates (possibly a single-item list) and a picture of the face of the driver may be found in a list or datastore of faces (possibly a single-item list or datastore). In some embodiments, a specific pair of a license plate and a driver (or face of a driver) may be a condition associated with the expected arrival event. For example, the pairs of Driver A and License Plate X, and Driver B and License Plate Y may be authorized pairs while the pair of Driver A and License Plate Y may be an unauthorized pair. That is, the pair of Driver A and License Plate Y may not satisfy a condition associated with the expected arrival event while Driver A with License Plate X or Driver B with License Plate Y does satisfy the same condition.

If the processor determines that the conditions associated with the expected arrival event have been sufficiently satisfied at the decision 516, flow control may proceed to an operation 520. At the operation 520, the processor may cause the smart gate to open. That is, the processor may actuate the gate in response to determining that the conditions associated with the expected arrival event have been sufficiently satisfied.

Returning back to the decision 512, if the processor determines that the vehicle is not associated with an expected arrival event at the decision 512, flow control may proceed to an operation 514. At the operation 514, the processor may execute a non-automatic gate-opening process. For example, the processor may request permission to open the smart gate from an operator or manager of the smart gate. Specifically, the processor may transmit a message to a user device associated with the operator or manager wherein the message requests permission or approval for the vehicle to go through the smart gate.

After the operation 514, flow control may proceed to a decision 522. At the decision 522, the processor determines if all tests associated with the non-automatic gate-opening process have been passed. A test may include, for example, receiving approval or permission from a manager or operator of the smart gate. In this example, passing the test may entail receiving permission or approval from the manager or operator. In the event that there are no test associated with the non-automatic gate-opening process, the processor may determine, deem, or consider that all tests associated with the process have been passed. In the event that all tests associated with the non-automatic gate-opening process have been passed, the processor may determine, deem, or consider that the conditions associated with the expected arrival event have been sufficiently satisfied. If the processor determines that all tests have been passed, flow control may proceed to the operation 520 and the processor may actuate the gate. Otherwise, the flow control may proceed to an operation 526. At the operation 526, the smart gate remains closed. That is, the process does not cause the smart gate to open. After the operation 526, flow control may return to the operation 502. That is, the processor may continue to receive and monitor data from the one or more sensors deployed on, near, or around the smart gate.

Returning to the decision 516, if the processor determines that the conditions, or any of the conditions, associated with the expected arrival event have not been satisfied, flow control may proceed to an operation 518. At the operation 518, the processor may execute an exception handling process or procedure. For example, if the actual arrival time of the vehicle is outside of the time interval or time window associated with the expected arrival event, the processor may communicate with a driver or occupant of the vehicle via wireless communication with an onboard system of the vehicle. In particular, the processor may request an explanation as to why the actual arrival time is not within the time interval. In another example, if the driver of the vehicle is not an authorized person, the processor may transmit a message or notification to a user device of a manager or operator of the smart gate. The message or notification may include an image of the face of the driver and the text "Driver is not an authorized person. Is entry approved?"

After the operation 518, flow control may proceed to a decision 524. At the decision 524, the processor determines if all tests associated with the exception handling procedure have been passed. A test associated with the exception handling procedure may be the validity of the actual arrival time being outside of the time interval. The processor may determine that this test has been passed if the driver or occupant of the vehicle provides a valid reason or justification for the actual arrival time failing to coincide with the time interval. If there are no tests associated with the exception handling procedure, the processor may determine, deem, or consider that all such tests have been passed. In some embodiments, the processor may determine, deem, or consider, that the conditions associated with the expected arrival event have been sufficiently satisfied if all test associated with the exception handling procedure have been passed. If the processor determines that all tests associated with the exception handling procedure have been passed, flow control may proceed to the operation 520 and the processor may actuate the gate or cause the gate to open. Otherwise, flow control may proceed to the operation 514 and the processor may execute the non-automatic gate-opening process.

Figure 6B:
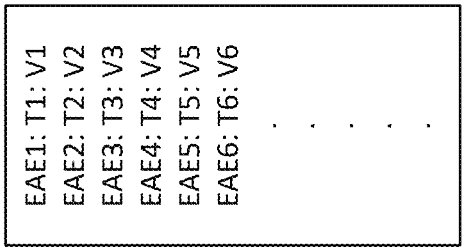
FIG. 6B is a simplified representation of a storage for expected arrival events.
Figure 6A:
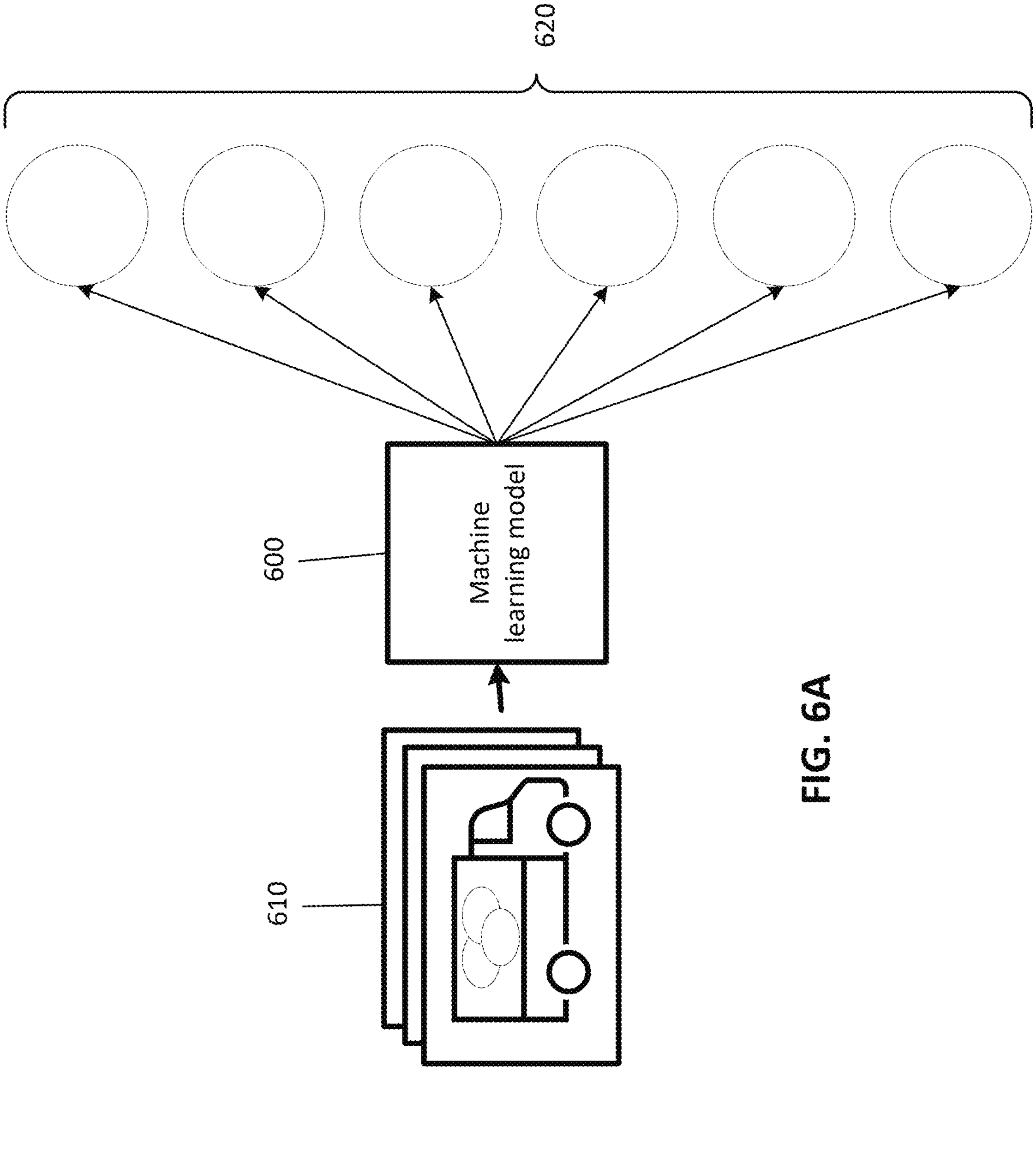
FIG. 6A is a simplified diagram of using a machine learning model to recognize a vehicle.

Reference is made to FIG. 6A which is a simplified diagram of using a machine learning model to recognize a vehicle. The machine learning model may be used by a processor of a smart gate, smart gate system, or a computer system controlling a smart gate. FIG. 6A may be considered a representation of some of the steps used to process one or more images of a vehicle in the operation 510 in the method 500 (see. FIG. 5).

FIG. 6A shows a machine learning model 600. The machine learning model 600 may be a vehicle recognition machine learning model, a logo recognition machine learning model, or both a vehicle recognition machine learning model and a logo recognition machine learning model. In some embodiments, the machine learning model 600 may be implemented using a CNN. In some embodiments, the machine learning model 600 may be a CNN trained on vast datasets of vehicle models. In some embodiments, the machine learning model 600 may be a CNN trained on vast data sets of logos. In some embodiments, the machine learning model 600 may be trained using federated learning. For example, a plurality of smart gates may be installed in multiple locations and the machine learning model 600 may be trained at each or some of these locations or installations using federated learning. In this example, data, other than the machine learning model 600 itself, may not be shared between the locations or installations, thereby maintaining privacy.

FIG. 6A further shows one or more images 610 of the vehicle being input into the machine learning model 600. Image capturing devices deployed near, around, or on the smart gate may capture the one or more images 610.

FIG. 6A further shows a plurality of possible outputs or classifications 620 of the machine learning model 600. Some of the possible classifications 620 may correspond to a vehicle model. Likewise, some of the possible classifications 620 may correspond to a logo. In some embodiments, the possible classifications 620 may include a set of pair wherein each pair in the set comprises a vehicle model and a logo.

In some embodiments, the machine learning model 600, upon receiving the one or more images 610 as input, may assign a weight to each of the classifications 620. The machine learning model 600 may output that the vehicle corresponds to the classification with the heaviest or greatest weight.

In some embodiments, one of the classifications 620 may correspond to an unknown, indefinite, or unrecognized status. That is, this classification may have the heaviest or greatest weight when the processor or machine learning model 600 does not recognize the vehicle.

Reference is made to FIG. 6B which is a simplified representation of a storage for expected arrival events. This storage may be part of an internal storage of a smart gate, smart gate system, or computer system controlling a smart gate of a property or facility. Additionally or alternatively, this storage may be part of an external dataset and the data may be retrieved by the smart gate, smart gate system, or computer system controlling the smart gate.

The expected arrival events may be data or a collection of data indicating or representing that particular or specific vehicles or authorized vehicles are scheduled to or expected to arrive at the property or facility during a time window or time interval. The time window or time interval may be defined by a first time and a second time wherein the first time is earlier than the second time. In some embodiments, it may be said that an expected arrival event is associated with a time interval defined by the first time and the second time. The expected arrival event may also include or be associated with conditions such as a driver of the vehicle being a particular person or authorized person, a driver of the vehicle wearing a uniform or authorized uniform, a number of occupants of the vehicle, or an authorized license plate number. The actual arrival time of the vehicle coinciding with the time window or time interval may also be a condition.

FIG. 6B shows the expected arrival events being stored in a list. Each item in the list shown n FIG. 6B follows the following format: "(expected arrival event ID): (time interval): (vehicle model)." While the expected arrival events in the embodiment in FIG. 6B appear to be defined by 3 data entries, other embodiments may have additional or alternative entries. Such additional or alternative entries include logo, face or reference to list of faces, uniform or reference to list of uniforms, number of occupants, service provider, service being provided, specific instructions from the service provider, specific instructions from a manager or operator of the smart gate, etc.

A processor of the smart gate, smart gate system, or computer system may refer to or retrieve data from the list of expected arrival events to determine if a vehicle that has arrived at the gate is associated with an expected arrival event. Additionally or alternatively, the processor may refer to or retrieve data from the list to determine if conditions associated with an expected arrival event have been sufficiently satisfied.

Figure 7:
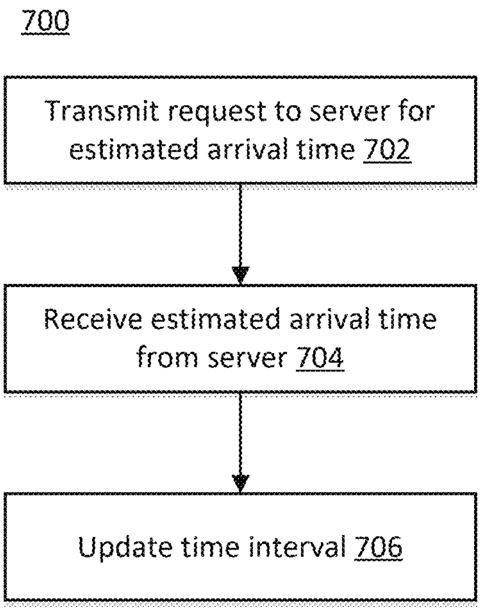
FIG. 7 shows, in flow chart form, a method for updating a scheduled time interval associated with an expected arrival event.

Reference is made to FIG. 7 which shows, in flow chart form, a method 700 for updating a scheduled time interval associated with an expected arrival event. The method 700 may be performed by a smart gate of a property or facility such as the smart gate 100 as shown in FIG. 3. In other embodiments, the method 700 may be performed by a computer system or smart gate system controlling a smart gate such as the computer system 170A as shown in FIG. 1A. The smart gate or computer system may comprise a processor and a wireless communication system. In particular, the smart gate or computer system may have a memory storing computer-executable instructions for the processor to execute operation of the method 700. In some embodiments, the method 700 may be performed prior to the method 500 (see FIG. 5).

The method 700 begins with an operation 702. At the operation, 700 the processor may, via wireless communication, transmit a request to a server associated with an expected arrival event. The request may be a request for the server to provide an estimated arrival time for a vehicle associated with the expected arrival event.

After the operation 702, flow control may proceed to the operation 704. At the operation 704, the processor may receive from the server, via wireless communication, an estimate arrival time for the vehicle.

After the operation 704, flow control may proceed to the operation 706. At the operation 706, the processor may update or set a time interval or time window associated with the expected arrival event. That is, the processor may, in response to receiving the estimated arrival time, update or set a first time and a second time that define the time interval associated with the expected arrival event. In some embodiments, the updating or setting may involve centering the time interval around the estimated time period. For example, the processor may set the first time to 30 minutes before the received estimated arrival time and set the second time to 30 minutes after the received estimated arrival time. For example, if the estimated arrival time is 2:30 p.m., the processor may set the first time to 2:00 p.m. and the second time to 3:00 p.m.

Figure 8:
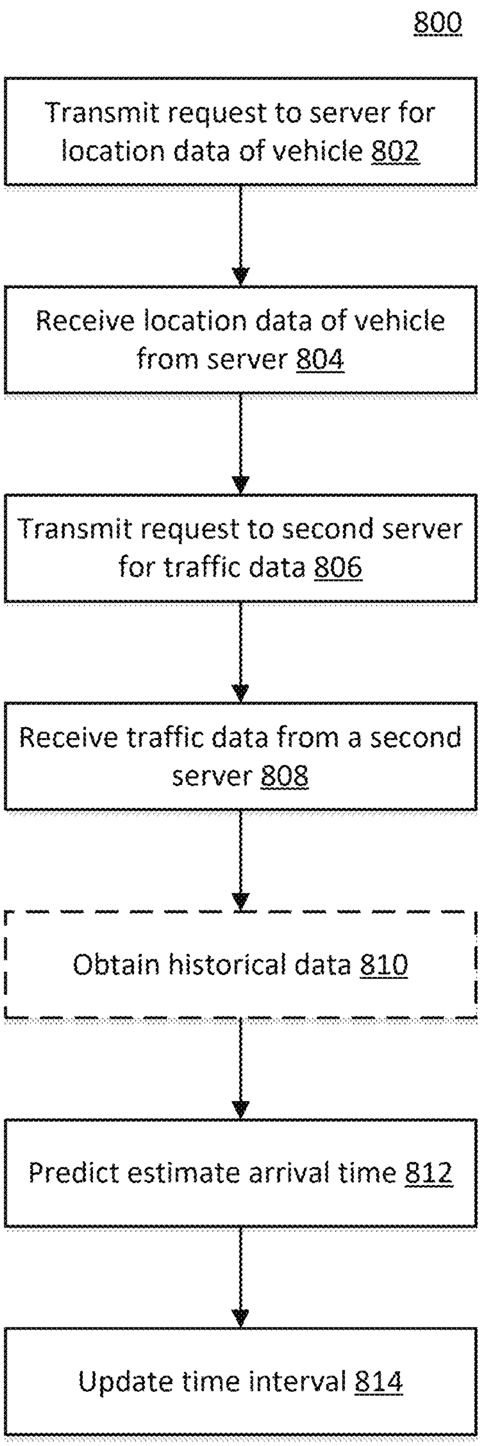
FIG. 8 shows, in flow chart form, another method for updating a scheduled time interval associated with an expected arrival event.

Reference is made to FIG. 8 which shows, in flow chart form, another method 800 for updating a scheduled time interval associated with an expected arrival event. The method 800 may be performed by a smart gate of a property or facility such as the smart gate 100 as shown in FIG. 3. In other embodiments, the method 800 may be performed by a computer system or smart gate system controlling a smart gate such as the computer system 170A as shown in FIG. 1A. The smart gate or computer system may comprise a processor and a wireless communication system. In particular, the smart gate or computer system may have a memory storing computer-executable instructions for the processor to execute operation of the method 800. In some embodiments, the method 800 may be performed prior to the method 500 (see FIG. 5).

The method begins with an operation 802. At the operation 802, the processor may, via wireless communication, transmit a request to a server associated with an expected arrival event. The request may be a request for location data or location information related to a vehicle associated with the expected arrival event. The location data or location information may identify a location of the vehicle.

After the operation 802, flow control may proceed to an operation 804. At the operation 804, the processor may receive, from the server, the location data related to the vehicle. That is, the processor may receive, via wireless communication, location data identifying the location of the vehicle. In some embodiments, the location data may include Global Positioning System (GPS) coordinates.

After the operation 804, flow control may proceed to an operation 806. At the operation 806, the processor may transmit a request to a second server. The request may include that the second server send, to the processor, smart gate, or computer system, traffic data related to a route from the location to the smart gate. The traffic data may include data reflecting, indicating, or representing traffic congestion on roads.

After the operation 806, flow control may proceed to an operation 808. At the operation 808, the processor may receive, from the second server, via wireless communication, the traffic data.

Following the operation 808, flow control may proceed to an optional operation 810. At the optional operation 810, the processor may obtain, from a storage, historical data related to the expected arrival event. For example, the expected arrival event may be one of a series of recurring scheduled events such as a garbage collection service. In this example, a storage may store or record the actual arrival times of motor vehicles associated with past expected arrival events. Thus, the processor may obtain this historical data for at least one motor vehicle in relation to these recurring scheduled events.

Following the optional operation 810 or the operation 808, flow control may proceed to an operation 812. At the operation 812, the processor may predict an estimated arrival time, based on the location data and the traffic data. Additionally or alternatively, the processor may consider the historical data to predict the estimated arrival time.

After the operation 812, flow control may proceed to an operation 814. At the operation 814, the processor may update or set a time interval or time window associated with the expected arrival event. That is, the processor may, based on the estimated arrival time, update or set a first time and a second time that define the time interval associated with the expected arrival event. In some embodiments, the updating or setting may involve centering the time interval around the estimated time period. For example, the processor may set the first time to 30 minutes before the received estimated arrival time and set the second time to 30 minutes after the received estimated arrival time. For example, if the estimated arrival time is 2:30 p.m., the processor may set the first time to 2:00 p.m. and the second time to 3:00 p.m.

Figure 9:
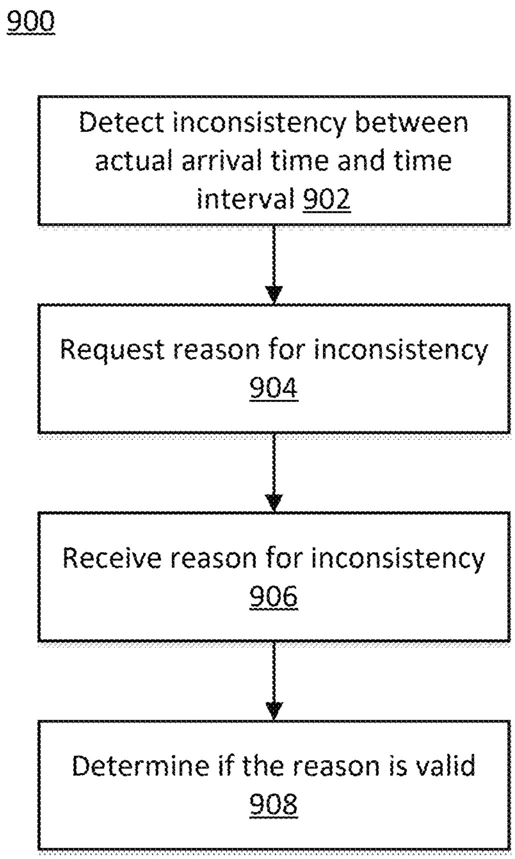
FIG. 9 shows, in flow chart form, an exception handling procedure executed when a vehicle associated with an expected arrival event arrives outside of the scheduled time interval associated with the expected arrival event.

Reference is now made to FIG. 9 which shows, in flow chart form, a method 900 that is executed when a vehicle associated with an expected arrival event arrives outside of the scheduled time interval associated with the expected arrival event. The method 900 may be performed by a smart gate of a property or facility such as the smart gate 100 as shown in FIG. 3. In other embodiments, the method 900 may be performed by a computer system or smart gate system controlling a smart gate such as the computer system 170A as shown in FIG. 1A. The smart gate or computer system may comprise a processor and a wireless communication system. In particular, the smart gate or computer system may have a memory storing computer-executable instructions for the processor to execute operation of the method 900. In some embodiments, part of the method 900 may execute as part of the operation 518 in the method 500 (see FIG. 5).

The method 900 begins with an operation 902. At the operation 902, the processor may detect an inconsistency between an actual arrival time of the vehicle and a time interval associated with the expected arrival event. For example, the actual arrival time may not coincide with the time interval. That is, the vehicle may be early or delayed relative to when the vehicle was expected to arrive.

After the operation 902, flow control may proceed to an operation 904. At the operation 904, the processor may transmit to an onboard system of the vehicle, in response to detecting the inconsistency, via wireless communication, a notification wherein the notification includes request for an explanation for the inconsistency. For example, the processor may send an audio message to the onboard system. The onboards system may then play the audio message for the occupants of the vehicle to hear. The audio message may be akin to the following.

"You are scheduled to arrive at 2:00 p.m. It is currently 3:23 p.m. Please explain delay."

Additionally or alternatively, the processor may send a text message to be displayed by the onboard system.

After the operation 904, flow control may proceed to an operation 906. At the operation 906, the processor may receive from the onboard system, via wireless communication, a voice message wherein the voice message includes a reason or justification for the inconsistency. In some embodiments, the creating the voice message may include having one of the occupants speak into a mic or sound recording device in the vehicle.

After the operation 906, flow control may proceed to an operation 908. At the operation 908, the processor may determine if the reason or justification in the voice message is valid. The processor may use artificial intelligence such as NLP or a NLP machine learning model to process the voice message and determine if the reason or justification is valid.

If the processor determines that the reason or justification is valid, the processor may cause the smart gate to open. Additionally or alternatively, the processor may perform another method, process, procedure, or series of computer-executable instructions. On the other hand, if the processor determines that the reason or justification is invalid, the processor may cause the smart gate to remain closed. Additionally or alternatively, the processor may perform another method, process, procedure, or series of computer-executable instructions. For example, the processor may transmit an entry request for the vehicle to a user device associated with a manager or operator of the smart gate.

Figure 10:
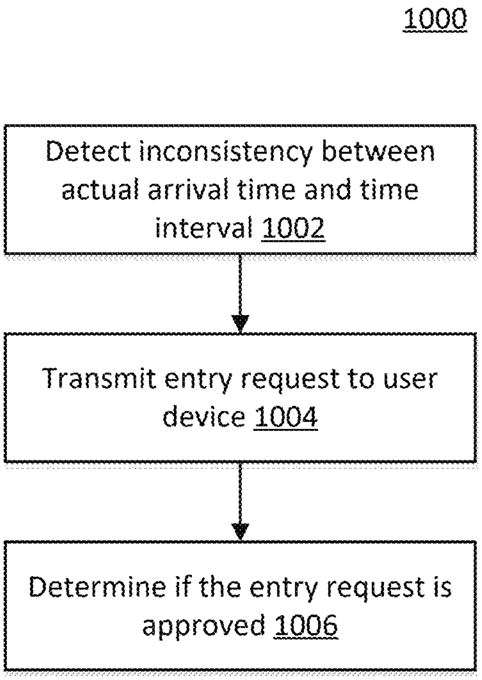
FIG. 10 shows, in flow chart form, a method for requesting entry approval from a user or user device.

Reference is now made to FIG. 10 which shows, in flow chart form, a method 1000 for requesting entry approval from a user or user device. The user may be a manager or operator of a smart gate such as the smart gate 100 as shown in FIG. 1, 2, or 3. Additionally or alternatively, the user may be a manager or operator of a smart gate such as the smart gate 100A as shown in FIG. 1A. Additionally or alternatively the user device may be coupled or operatively connected to the smart gate. The method 1000 may be performed by the smart gate or, alternatively, a computer system controlling the smart gate. The smart gate or computer system may comprise a processor and a wireless communication system. In particular, the smart gate or computer system may have a memory storing computer-executable instructions for the processor to execute operation of the method 1000. In some embodiments, part of the method 1000 may execute as part of the operation 514 in the method 500 (see FIG. 5).

The method 1000 begins with the operation 1002. At the operation 1002, the processor may detect an inconsistency between an actual arrival time of a vehicle associated with an expected arrival event and a time interval associated with the expected arrival event. For example, the actual arrival time may not coincide with the time interval. That is, the vehicle may be early or delayed relative to when the vehicle was expected to arrive.

After the operation 1002, flow control may proceed to an operation 1004. At the operation 1004, the processor may send to the user device, in response to detecting the inconsistency, an entry request for the vehicle. In some embodiments, the request may be transmitted wirelessly. For example, the processor may transmit the message "This vehicle has arrived at the front gate. Do you approve entry of this vehicle?" In this example, the message may be accompanied with an image of the vehicle captured by an image capturing device deployed near, around, or on the smart gate. In another example, the user device may display on a user interface, a "Yes" button and a "No" button. Pressing, clicking, or swiping the "Yes" button may be an act of approving, allowing, or permitting the entry request. Likewise, pressing, clicking, or swiping the "No" button may be an act of rejecting entry request.

After the operation 1004, flow control may proceed to a decision 1006. At the decision 1006, the processor determines if it has received an entry approval for the vehicle. An entry approval may indicate that the user has approved of the entry request. In some embodiments, the processor may receive from the user device, via wireless communication, the entry approval. For example, the processor may receive an indication or signal that the user swiped on a "Yes" button. In some embodiments, the processor may determine that the user has rejected the entry request if the user does not respond to the entry request within a time frame. For example, if 5 minutes elapse after transmitting the entry request and the user has not responded, the processor may determine that the entry request has been rejected.

In some embodiments, the expected arrival event may be one of a series of recurring scheduled events such as a garbage collection service. In these embodiments, in response to receiving the entry approval despite the inconsistency, the processor may adjust the time intervals associated with future expected arrival events in the same series. For example, the processor may set a next time interval associated with a next expected arrival event in the series to be longer than the time interval. For example, in a series of garbage collection service events scheduled to occur at 11:00 am every Wednesday, the time intervals associated with each expected arrival event in the series may be set to 10:30 a.m. to 11:30 a.m. In response to receiving entry approval for a garbage truck at 11:42 a.m. on a Wednesday, the processor may set future expected arrival events to have an associated time interval of 10:00 a.m. to 12:00 p.m.

Figure 11:
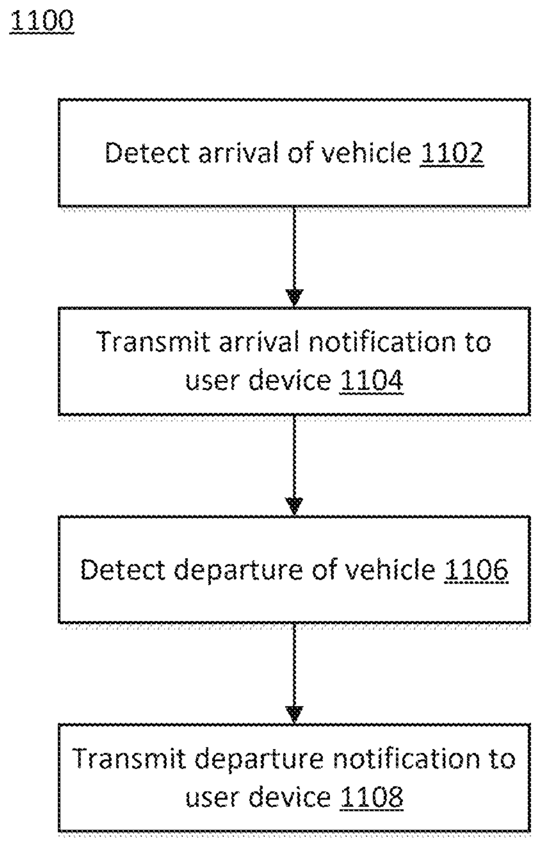
FIG. 11 shows, in flow chart form, a method for notifying a user or user device of the time a vehicle or person associated with a vehicle spends on a property.

Reference is made to FIG. 11 which shows, in flow chart form, a method 1100 for notifying a user or user device of the time a vehicle or person associated with a vehicle spends on a property or facility. The user may be a manager or operator of a smart gate such as the smart gate 100 as shown in FIG. 1, 2, or 3. Additionally or alternatively, the user may be a manager or operator of a smart gate such as the smart gate 100A as shown in FIG. 1A. Additionally or alternatively the user device may be coupled to or operatively connected to the smart gate. The method 1100 may be performed by the smart gate or, alternatively, a computer system controlling the smart gate. The smart gate or computer system may comprise a processor and a wireless communication system. In particular, the smart gate or computer system may have a memory storing computer-executable instructions for the processor to execute operation of the method 1100. In some embodiments, the processor may perform the method 1000, at least in part, concurrently with the method 500 (see FIG. 5).

The method 1100 begins with an operation 1102. At the operation 1102, the processor detects that the vehicle has arrived at or in front of the smart gate at an actual arrival time. In some embodiments, the processor may detect the vehicle by receiving and monitoring sensor data from one or more sensors deployed around, near, or on the smart gate. The one or more sensors may include motion sensors, heat sensors, cameras, and video cameras.

After the operation 1102, flow control may proceed to an operation 1104. At the operation 1104, the processor may send an arrival notification to the user device. In some embodiments, the arrival notification may be wirelessly transmitted. In some embodiments, the arrival notification may include, or have attached, one or more images of the vehicle. For example, one of the sensors may be an image capturing device and the processor may include or attach one or more images of the vehicle captured by the image capturing device. That is, the processor may, in response to receiving the one or more images of the vehicle, send an arrival notification to a user device associated with the property or facility, wherein the arrival notification includes at least one of the one or more images of the vehicle.

In some embodiments, the arrival notification may include a text message. For example, the arrival notification may include the text message "Vehicle seen in image arrived at 3:24 p.m."

After the operation 1104, flow control may proceed to an operation 1106. At the operation 1106, the processor may detect from sensor data received from the sensors that the vehicle is leaving or departing the property or facility at a departure time.

After the operation 1106, flow control may proceed to an operation 1108. At the operation 1108, the processor may send a departure notification to the user device. In some embodiments, the departure notification may be transmitted wirelessly. The departure notification may include an on-property time interval defined by the actual arrival time and the departure time. For example, the departure notification may include data or information that indicates, to the user or user device, the actual arrival time of the vehicle, the departure time of the vehicle, the amount of time the vehicle or its occupants were present at the property or facility, or a combination thereof. In some embodiments, the departure notification may include or have attached an image of the vehicle. In some embodiments, the departure notification may include a text message such as "Vehicle seen in image below departed to 3:38. Time on property: 14 minutes."

Figure 12:
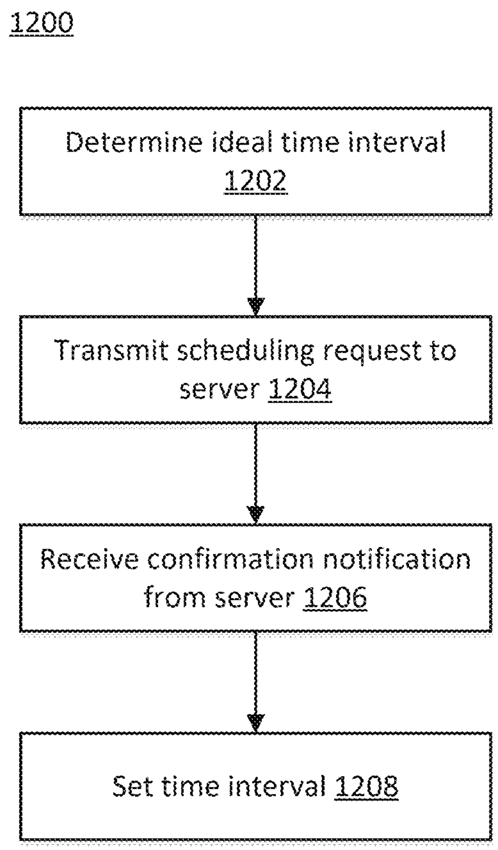
FIG. 12 shows, in flow chart form, a method for scheduling an expected arrival event.

Reference is made to FIG. 12 which shows, in flow chart form, a method 1200 for scheduling an expected arrival event. The method 1200 may be performed by a smart gate of a property or facility such as the smart gate 100 as shown in FIG. 3. In other embodiments, the method 900 may be performed by a computer system or smart gate system controlling a smart gate such as the computer system 170A as shown in FIG. 1A. The smart gate or computer system may comprise a processor and a wireless communication system. In particular, the smart gate or computer system may have a memory storing computer-executable instructions for the processor to execute operation of the method 1200. In some embodiments, the processor may perform the method 1200 prior to performing the method 500 (see FIG. 5).

The method 1200 begins with an operation 1202. At the operation 1202, the processor may determine an ideal time interval for the expected arrival event time. The ideal time interval may be defined by an ideal first time and an ideal second time. For example, the expected arrival event may be associated with a task or service such as a two-hour long repair on the property. The processor may determine that an ideal time for the two-hour long repair, or task or service, is between 12:00 p.m. and 4:00 p.m. The processor may then determine that an ideal time interval for repair service workers to arrive at the property for repairs, or ideal time interval for the repair to be initiated, is 12:00 p.m. to 2:00 p.m. That is, the ideal time interval is defined by an ideal first time 12:00 p.m. and an ideal second time 2:00 p.m.

In some embodiments, the processor may determine the ideal time interval by receiving input from a user device associated with the smart gate. A user of the user device may be a manager or operator of the smart gate. In some embodiments, an application may display a user interface on a display of the user device and the user may be able to interact with the processor, smart gate, or computer system via the user interface. For example, the user may input a desired time for a task or service via the user interface. The processor may then receive this input to determine an ideal time interval for the task or service to be initiated. In another example, the user may directly input an ideal time interval for the task or service to be initiated. In some embodiments, a service provider associated with the expected arrival event, such as a repair company, may provide the application. Additionally or alternatively, the application may be associated with the smart gate and input received from the user, such as a Uniform Resource Locator (URL) associated with the service provider, may allow the processor to interact with the service provider, or a server associated with the service provider, for the purpose of scheduling the expected arrival event.

After the operation 1202, flow control may proceed to an operation 1204. At the operation 1204, the processor may transmit to a server associated with the expected arrival event, via wireless communication, a scheduling request to have the expected arrival event occur during the ideal time interval. For example, the scheduling request may request that a vehicle associated with the expected arrival event arrive during the ideal time interval. In some embodiments, the server may be associated with a service provider and the service provider may provide an API. The processor may use this API to transmit and receive messages to and from the server.

After the operation 1204, flow control may proceed to an operation 1206. At the operation 1206, the processor may receive, via wireless communication, a confirmation notification from the server associated with the expected arrival event. The confirmation notification may include confirmation from the server that the server has instructed a vehicle associated with the expected arrival event to arrive at the property or facility during the ideal time interval.

After the operation 1206, flow control may proceed to an operation 1208. At the operation 1208, the processor may set a time interval associated with the expected arrival event to be the ideal time interval. That is, the time interval may be defined by a first time and a second time that the processor may set the first time to the ideal first time and the second time to the ideal second time.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including digital video discs (DVDs), compact disc read-only memories (CD-ROMs), universal serial bus (USB) flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A smart gate controller for a gate of a property, the smart gate controller comprising:

a processor;

a memory storing processor-executable instructions that, when executed, cause the processor to:

receive sensor data from one or more sensors deployed on the gate;

detect from the sensor data that a vehicle has arrived at the gate at an actual arrival time;

receive, from at least a first one of one or more image capturing devices, the one or more image capturing devices being a subset of the one or more sensors, one or more images of the vehicle;

determine, by processing the one or more images of the vehicle, that the vehicle is associated with an expected arrival event of a series of recurring scheduled events, the expected arrival event being associated with a time interval defined by a first time and a second time, the first time being earlier than the second time;

detect an inconsistency between the actual arrival time and the time interval;

determine that conditions associated with the expected arrival event have been sufficiently satisfied; and in response to determining that the conditions have been sufficiently satisfied:

set, based at least on the inconsistency, a next time interval, associated with a next expected arrival event in the series, to be longer than the time interval; and actuate the gate.

2. The smart gate controller of claim 1 wherein the processor is further configured to determine that the vehicle is associated with the expected arrival event by:

using the one or more images of the vehicle as input to a vehicle recognition machine learning model; and determining that the vehicle belongs to a class of vehicles associated with the expected arrival event.

3. The smart gate controller of claim 1 wherein the processor is further configured to determine that the vehicle is associated with the expected arrival event by:

recognizing, by using the one or more images of the vehicle as input to a logo recognition machine learning model, a logo on the vehicle; and determining that the logo is associated with the expected arrival event.

4. The smart gate controller of claim 1 wherein the processor is further configured to determine that the conditions associated with the expected arrival event have been sufficiently satisfied by:

receiving, from at least a second one of the one or more image capturing devices, one or more images of a face of a driver of the vehicle; and determining, by processing the one or more images of the face, that the driver is an authorized person.

5. The smart gate controller of claim 1 wherein the processor is further configured to determine that the conditions associated with the expected arrival event have been sufficiently satisfied by:

detecting, from the sensor data, a number of occupants of the vehicle; and determining that the number of occupants is an expected number of occupants associated with the expected arrival event.

6. The smart gate controller of claim 1 wherein the processor is further configured to determine that the conditions associated with the expected arrival event have been sufficiently satisfied by:

receiving, from at least a second one of the one or more image capturing devices, one or more images of a driver of the vehicle; and determining, by processing the one or more images of the driver, that the driver is wearing a uniform associated with the expected arrival event.

7. The smart gate controller of claim 1 wherein the smart gate controller is coupled to a wireless communication system and the processor is further configured to:

receive from a server, via a wireless communication, prior to the vehicle arriving at the gate, an estimated arrival time of the vehicle; and update, in response to receiving the estimated arrival time, the first time and the second time.

8. The smart gate controller of claim 1 wherein the smart gate controller is coupled to a wireless communication system and the processor is further configured to:

receive from a server, via wireless communication, prior to the vehicle arriving at the gate, location data identifying a location of the vehicle;

receive from a second server, via wireless communication, traffic data related to a route from the location to the gate;

predict an estimated arrival time based on the location data and the traffic data; and update based on the estimated arrival time, the first time and the second time.

9. The smart gate controller of claim 8 wherein the processor is further configured to predict the estimated arrival time by:

obtaining, from a storage, historical data related to arrivals of at least one motor vehicle in relation to the recurring scheduled events; and considering the historical data to predict the estimated arrival time.

10. The smart gate controller of claim 1 wherein the processor is further configured to determine that the conditions associated with the expected arrival event have been sufficiently satisfied by:

transmitting to an onboard system of the vehicle, in response to detecting the inconsistency, via wireless communication, a notification wherein the notification includes a request for an explanation for the inconsistency;

receiving from the onboard system, via wireless communication, a voice message, the voice message including a reason for the inconsistency; and determining, by processing the voice message using a natural language processing machine learning model, that the reason is valid.

11. The smart gate controller of claim 1 wherein the processor is further configured to send, in response to receiving the one or more images of the vehicle, an arrival notification to a user device associated with the property, the arrival notification including at least one of the one or more images of the vehicle.

12. The smart gate controller of claim 11 wherein the processor is further configured to determine that the conditions associated with the expected arrival event have been sufficiently satisfied by:

sending to the user device, in response to detecting the inconsistency, an entry request for the vehicle; and receiving, from the user device, an entry approval for the vehicle.

13. The smart gate controller of claim 11, wherein the processor is further configured to:

detect from the sensor data that the vehicle is leaving the property at a departure time; and send a departure notification to the user device, the departure notification including an on-property time interval defined by the actual arrival time and the departure time.

14. The smart gate controller of claim 11 wherein the processor is further configured to:

detect from the sensor data that one of the one or more sensors is performing at a performance level lower than a standard; and send, in response to detecting the lower performance level, a performance level notification to the user device, the performance level notification indicating that the one of the one or more sensors is performing at the lower performance level.

15. The smart gate controller of claim 1 wherein:

the smart gate controller is coupled to a wireless communication system;

the expected arrival event is associated with a task; and the processor is further configured to:

determine, prior to the vehicle arriving at the gate, an ideal time interval for the task to be initiated, the ideal time interval being defined by an ideal first time and an ideal second time;

transmit to a server associated with the expected arrival event, via wireless communication, a scheduling request to have the expected arrival event occur during the ideal time interval;

receive from the server, via wireless communication, a confirmation notification, the confirmation notification including confirmation that the server has instructed the vehicle to arrive at the property during the ideal time interval; and set the first time to be the ideal first time and the second time to be the ideal second time.

16. The smart gate controller of claim 1 wherein one or more light sources are deployed on the gate and the processor is further configured to:

detect, from the sensor data, that the vehicle is near the gate;

determine, from the sensor data, that an area around the gate has a brightness measure below a lighting threshold, the lighting threshold being related to an accuracy measure related to processing the one or more images of the vehicle; and cause at least one of the one or more light sources to turn on.

17. A computer-implemented method for actuating a gate of a property, the method comprising:

receiving sensor data from one or more sensors deployed on the gate;

detecting, from the sensor data, that a vehicle has arrived at the gate at an actual arrival time;

receiving, from at least a first one of one or more image capturing devices, the one or more image capturing devices being a subset of the one or more sensors, one or more images of the vehicle;

determining, by processing the one or more images of the vehicle, that the vehicle is associated with an expected arrival event that is one of a series of recurring scheduled events, the expected arrival event being associated with a time interval defined by a first time and a second time, the first time being earlier than the second time;

detecting an inconsistency between the actual arrival time and the time interval;

determining, based at least in part on the actual arrival time and the time interval, that conditions associated with the expected arrival event have been sufficiently satisfied; and in response to determining that the conditions have been sufficiently satisfied:

setting, based at least on the inconsistency, a next time interval, associated with a next expected arrival event in the series, to be longer than the time interval; and actuating the gate.

18. The computer-implemented method of claim 17 wherein the method further comprises:

receiving from a server, via wireless communication, prior to the vehicle arriving at the gate, location data identifying a location of the vehicle;

receiving from a second server, via wireless communication, traffic data related to a route from the location to the gate;

predicting an estimated arrival time based on the location data and the traffic data; and updating, based on the estimated arrival time, the first time and the second time.

19. A non-transitory computer-readable medium, storing processor-executable instructions to:

receive sensor data from one or more sensors deployed on a gate;

detect from the sensor data that a vehicle has arrived at the gate at an actual arrival time;

receive, from at least a first one of one or more image capturing devices, the one or more image capturing devices being a subset of the one or more sensors, one or more images of the vehicle;

determine, by processing the one or more images of the vehicle, that the vehicle is associated with an expected arrival event that is one of a series of recurring scheduled events, the expected arrival event being associated with a time interval defined by a first time and a second time, the first time being earlier than the second time;

detect an inconsistency between the actual arrival time and the time interval;

determine, based on the actual arrival time and the time interval, that conditions associated with the expected arrival event have been sufficiently satisfied; and in response to determining that the conditions have been sufficiently satisfied:

set, based at least on the inconsistency, a next time interval, associated with a next expected arrival event in the series, to be longer than the time interval; and actuate the gate.

20. The computer-implemented method of claim 17 wherein the method further comprises determining that the conditions associated with the expected arrival event have been sufficiently satisfied by:

transmitting to an onboard system of the vehicle, in response to detecting the inconsistency, via wireless communication, a notification wherein the notification includes a request for an explanation for the inconsistency;

receiving from the onboard system, via wireless communication, a voice message, the voice message including a reason for the inconsistency; and determining, by processing the voice message using a natural language processing machine learning model, that the reason is valid.

* * * * *